(12) United States Patent
Barkan

(10) Patent No.: US 9,042,306 B2
(45) Date of Patent: *May 26, 2015

(54) WIRELESS INTERNET SYSTEM AND METHOD

(71) Applicant: Elad Pinhas Barkan, Kfar Sirkin (IL)

(72) Inventor: Elad Pinhas Barkan, Kfar Sirkin (IL)

(73) Assignee: Barkan Wireless Access Technologies, L.P., Allen, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/987,881

(22) Filed: Sep. 11, 2013

(65) Prior Publication Data

US 2014/0086101 A1    Mar. 27, 2014

Related U.S. Application Data

(63) Continuation of application No. 12/665,978, filed as application No. PCT/IL2007/000244 on Dec. 22, 2006, now Pat. No. 8,559,369.

(60) Provisional application No. 60/775,321, filed on Feb. 22, 2006, provisional application No. 60/794,135, filed on Apr. 24, 2006.

(51) Int. Cl.
| | | |
|---|---|---|
| *H04W 88/04* | (2009.01) | |
| *H04W 76/02* | (2009.01) | |
| *H04W 12/08* | (2009.01) | |
| *H04W 80/00* | (2009.01) | |
| *H04W 84/10* | (2009.01) | |
| *H04W 88/06* | (2009.01) | |
| *H04W 36/00* | (2009.01) | |
| *H04W 36/18* | (2009.01) | |

(52) U.S. Cl.
CPC ............ *H04W 76/022* (2013.01); *H04W 12/08* (2013.01); *H04W 80/00* (2013.01); *H04W 84/10* (2013.01); *H04W 88/04* (2013.01); *H04W 88/06* (2013.01); *H04W 36/0011* (2013.01); *H04W 36/18* (2012.01)

(58) Field of Classification Search
None
See application file for complete search history.

(56) References Cited

U.S. PATENT DOCUMENTS

| | | | |
|---|---|---|---|
| 6,950,628 B1 * | 9/2005 | Meier et al. | ................... 455/41.2 |
| 7,239,865 B2 | 7/2007 | Dyck et al. | |
| 7,346,025 B2 | 3/2008 | Bryson | |
| 7,382,771 B2 | 6/2008 | Leblanc et al. | |
| 7,668,545 B2 | 2/2010 | Dyck et al. | |
| 7,860,032 B2 | 12/2010 | Abrol et al. | |
| 7,877,081 B2 | 1/2011 | Sharma et al. | |
| 8,559,369 B2 | 10/2013 | Barkan | |
| 2002/0078059 A1 * | 6/2002 | Urera | ............................ 707/100 |

(Continued)

*Primary Examiner* — Hassan Phillips
*Assistant Examiner* — Gautam Sharma
(74) *Attorney, Agent, or Firm* — Spencer C. Patterson

(57) ABSTRACT

A method for providing a wireless Internet connection to WiFi-enabled devices (STAs) comprising: wirelessly connecting a first STA to the Internet through a first AP with a first SSID; remaining connected to the first Access Point (AP), the first STA creates a software-based wireless AP with a second SSID for wirelessly connecting other STAs to the Internet through the first STA. A software module running on the first STA allows a second STA a wide access to the Internet only if the second STA has a copy of the software module running installed and active therein. A method for configuring STAs to connect to a wireless network, comprising: a customer first connects a STA by wire to its network; a software on the STA copied to the STA the security information gained through the wired connection, thus setting the security parameters for the STA.

68 Claims, 22 Drawing Sheets

(56) References Cited

U.S. PATENT DOCUMENTS

| | | |
|---|---|---|
| 2002/0103879 A1* | 8/2002 | Mondragon ................. 709/218 |
| 2003/0051041 A1* | 3/2003 | Kalavade et al. ............ 709/229 |
| 2003/0165128 A1 | 9/2003 | Sisodia et al. |
| 2003/0228868 A1* | 12/2003 | Turanyi et al. ............ 455/432.1 |
| 2004/0042596 A1* | 3/2004 | Kim et al. ................ 379/112.01 |
| 2004/0103278 A1* | 5/2004 | Abhishek et al. ............. 713/160 |
| 2004/0116120 A1 | 6/2004 | Gallagher et al. |
| 2004/0141617 A1* | 7/2004 | Volpano ....................... 380/270 |
| 2004/0203836 A1 | 10/2004 | Gorday et al. |
| 2004/0221046 A1 | 11/2004 | Heinonen et al. |
| 2005/0030940 A1 | 2/2005 | Abrol et al. |
| 2005/0078624 A1* | 4/2005 | Shu et al. ...................... 370/328 |
| 2005/0220048 A1* | 10/2005 | Lee et al. ...................... 370/328 |
| 2005/0220106 A1* | 10/2005 | Raverdy et al. ............... 370/392 |
| 2005/0223086 A1* | 10/2005 | Raverdy et al. ............... 709/220 |
| 2005/0286476 A1 | 12/2005 | Crosswy et al. |
| 2006/0126565 A1 | 6/2006 | Shaheen |
| 2006/0135206 A1* | 6/2006 | Louks et al. .................. 455/557 |
| 2006/0153133 A1 | 7/2006 | Zhong |
| 2007/0121839 A1* | 5/2007 | Karaoguz et al. .......... 379/114.1 |
| 2007/0124802 A1* | 5/2007 | Anton et al. ...................... 726/3 |
| 2007/0160023 A1 | 7/2007 | Wittmann |
| 2007/0215684 A1* | 9/2007 | Jones ............................ 235/375 |
| 2007/0242657 A1* | 10/2007 | Waisman-Diamond ...... 370/352 |
| 2010/0296441 A1* | 11/2010 | Barkan ......................... 370/328 |

\* cited by examiner

WIRELESS INTERNET SYSTEM AND METHOD

CROSS-REFERENCE TO RELATED APPLICATIONS

The present application claims priority to and is a continuation of U.S. patent application Ser. No. 12/665,978, filed Dec. 22, 2009, now U.S. Pat. No. 8,559,369, which is a national stage entry of PCT/IL07/00244, filed Feb. 22, 2007, which claims priority from provisional U.S. Patent Application Ser. No. 60/775,321 filed on Feb. 22, 2006, and provisional U.S. Patent Application Ser. No. 60/794,135 filed on Apr. 24, 2006, all of which are hereby incorporated by reference in their entirety.

TECHNICAL FIELD

The present invention relates to a wireless Internet system and method, and more particularly to such systems for providing wireless Internet connection to roaming devices such as Portable computers, Laptops, PDAs and phones, and the deployment of such a system in a fast spreading manner (a viral-like method), in a client software-only manner such that the existing access points are not changed at all.

BACKGROUND ART

Currently, there is a growing number of WiFi public hotspots (or Access Points—"AP"). These APs allow WiFi-enabled devices (which we refer to as STA) that are in their coverage area to Connect to the internet.

Some of the APs are operated as a business, service, or as part of a community, either with or without a charge to the STA's owner. Other APs are placed by individuals in their premises, but are not "locked", i.e., they are "open", allowing bypassing STAs to utilize them. Other APs placed by individuals are "locked" (or "closed"), thus not allowing passing STAs to utilize them.

As APs are being deployed in growing numbers, many individuals lock their. APs for fear of unfair use of their network resources, and due to security concerns. For instance, there have been cases where a person places an open AP, and his neighbor uses this AP as its internet connection on a full-time basis without the consent of the first person, thus abusing and degrading the service of the first individual. In other cases, the neighbor hacked into the computer of the first person through the network. Thus, as time passes, most APs are either locked, or a payment is required to use them. Although the total number of APs and their area of coverage is growing fast, a larger percent of the APs are becoming locked and inaccessible to roaming STAs.

A prior art approach for allowing roaming customers to access the Internet is taken, by Fon (www.fon.com). It allows individuals to download a new software into their APs, which makes their APs a pay-for-use APs for STAs that roam in their vicinity, and in addition, they receive a username and password for free access to other APs which are operated by Fon or utilize their software. It also allows users to enjoy part of some of the payments made by other users to use the network. However, roaming STAs are forced either to find an open AP, find an AP for which they have an account, or pay for access in case there is a pay-for AP.

It is an aim of the current disclosure to provide a system and a method for deployment of APs for the purpose of connecting STAs to the Internet.

Roaming customers that connect to an AP are often far from the AP and have borderline reception conditions. As a result, the connection quality is very poor, and the user may experience a slow service or no service at all. It is another aim of the current disclosure to provide a system and a method for improving the connection quality for roaming STAs.

Another aspect of this invention refers to systems and methods for fast handovers in wireless networks, such as 802.11 networks, specifically in un-managed wireless networks, and more particularly such systems and methods which allow extremely fast handovers in these networks without any changes to existing 802.11 base stations. The invention also concerns efficient performance with regards to power consumption, coverage, security, installation, capacity and availability of wireless networks such as 802.11.

The invention can achieve these goals without any change to the WiFi access point.

Currently, there is a growing number of WiFi public hotspots (or Access Points—"AP"). These APs allow WiFi enabled devices (which we refer to as STA) that are in their coverage area to connect to the interne.

Some of the APs are operated as a business, service, or as part of a community, either with or without a charge to the STA's owner. Other APs are placed by individuals in their premises, but are not "locked", i.e., they allow bypassing STAs to utilize them. The cumulative connectivity provided by the APs is enormous and growing fast, thus, it is tempting to use this cumulative connectivity to compete with other wireless technologies. For example, it would be tempting to have a STA that looks like a cellular handset (i.e., a WiFi Handset, or WiFi Phone), where the WiFi handset uses the free connectivity to provide a "free" service that competes with or complements the cellular service.

One of the major difficulties of achieving this vision is that the coverage of a single WiFi AP is very small (about a few hundreds to a few thousands of square meters). When a user goes out of this area, his connectivity is lost. A natural naive approach to solve this problem is performing a handover (sometimes also called handoff) to another AP with a better radio connection to the user. Another approach is to have a handset which supports both WiFi and Cellular, and handover the conversation from WiFi to Cellular [See: WO 2004/036770], this way, WiFi extends the coverage of cellular, and conversation is handed over from WiFi to cellular, when there is no WiFi coverage. However, the problem of performing handover between one WiFi AP to another WiFi AP remains when appropriate cellular coverage is not available (or there is no cooperation from the cellular company). The same idea applies when cellular is replaced by other access technology, such as satellite communications.

The concept of handover is taken from cellular networks. Handovers usually work well in managed networks, such as cellular networks, campuses, or office environment, where the entire network is usually owned by the same operator.

The network operator in many cases chooses to add cells where coverage or capacity are needed. In managed networks, the APs (or the cellular cells) are synchronized and communicate with each other through a backbone, and are usually controlled by some other network entity (e.g., BSC—base station controller in cellular systems). For example, the APs can communicate with each other, for example using the IEEE 802.11F protocol—the Inter-AP protocol, which involves a RADIUS (Remote Authentication Dial In User Service, see RFC 2138, 2865, and 2866) server.

The APs can also employ a radio resource management such as IEEE 802.11K, or fast roaming using IEEE 802.11R, etc. However, in unmanaged networks, the APs can be deployed by many unrelated entities, such as by private individuals.

There is usually no entity that synchronizes the APs. The APs can be manufactured by various manufacturers, use various security mechanisms etc. In unmanaged networks, the handovers are typically very slow, as in the process of handover, it takes time for the STA to re-connect to the internet in the new AP (and it must disconnect from the previous AP). In such a handover in an unmanaged network, the IP address often changes. Therefore, a mechanism such as mobile IP must be used (as described later). This mechanism is limited with respect to the frequency in which the IP address can change, and a large latency (disconnection time) may result during the handover process. During the latency, the STA cannot receive any incoming messages.

A handover process is typically composed of the station STA connecting to a new AP, and disconnecting from the old AP. If STA is connected in parallel to both AP the handover is called soft-handover, and if STA first abandons the old AP and then connects to the new AP, the handover is called a hard-handover. Soft handovers require the ability of STA to communicate in parallel with at least two APs.

The process of connecting to a new AP is usually composed of the following steps:

1. STA performs a scanning process to discover neighboring APs.
2. STA chooses a new AP, and performs authentication with the AP, in which the AP verifies that STA is allowed to access the AP.
3. If the authentication is successful, STA performs an association process; in which the AP acknowledges that STA is connected to it (association requires the AP to allocate resources to the STA, and the 802.11 standard allows up to 2007 STAs to be associated with an AP).
4. Once STA is associated with the AP, the STA makes sure that it has all the information that it requires to communicate over the internet, for example, it must have an IP address, and it must update servers that govern its location (such as Mobile IP, as discussed later). In some cases, the user should go through a second authentication procedure (usually with a RADIUS server). Many times, this procedure is performed over a web interface, which is called a Captive Portal.

When a captive portal is used by the AP, the user needs to surf into the captive portal and perform a log-in to connect his IP address to the Internet. In some implementations, the user's web browser is forwarded to the captive portal regardless of the internet site that it tries to surf into. Some APs allow the STA to surf in some limited number of internet sites before they complete the second authentication procedure (for example, if the AP is in an hotel, it might allow surfing into the hotel's website, or affiliated news web sites).

The procedure at the captive portal typically includes authentication, payment, or agreeing to terms of usage. Once the authentication is completed, the IP address of the STA is connected to the Internet (usually by reconfiguring the firewall that controls the communications of the AP). Each sub-process takes time to complete, resulting in a total delay of over several seconds to complete the entire process.

In managed networks, Step 4 can be performed once in a certain amount or time (or for a certain area), as moving between APs of the managed network does not necessarily change the parameters of the STA such as IP address etc. However, in un-managed networks (and sometimes also in managed networks), the STA must gain a new IP address and other parameters, usually through DHCP (Dynamic Host Configuration Protocol, see RFC 1541). Completing the DHCP protocol can take up to several seconds. Sometimes, obtaining an IP is not enough, and a second authentication is needed. In other cases, a proxy server or a Socks server should be set for the communication. The entire process can consume a few seconds, which are intolerable in a streaming two-way application such as a voice conversation.

Many protocols that are used in the Internet require that the IP address of the STA would remain fixed during communications (for example, TCP—Transport Control Protocol, see RFC 793). However, a handover might result in the change of the IP address. This change of IP address causes a break in the communication as the communication needs to be restarted.

One solution to this problem is provided by the Mobile IP standard (see RFC 2002): in this solution the STA updates a server with its current IP address, every time that the IP address changes. As a preparation for roaming, the server allocates to the STA (in addition to the STA's current IP address) an IP address that remains fixed, even when the real IP address of the STA changes. This fixed IP address is also known as a "care of" address. From this moment on, the STA keeps the server posted of the real IP address of the STA, and the STA can use (in its communications with the rest of the Internet) the "care of" address (or its home address) as if it was its own fixed address.

Any IP data packet that is sent to the care-of IP address is tunneled by the Mobile-IP server to the current. IP address of the STA. For packets originating from the STA to the Internet, the STA can tunnel the packets to the Mobile-IP server, which replaces the IP address with the care-of address. However, many times the STA can simply write its care-of IP address as the source address of the IP data packet, as many times, the source address of IP packets is not checked what-so-ever in the course of routing the IP data packet in the Internet.

The Mobile-IP solution can be applied as long as the handovers are not performed too often. However, it incurs the punishment of routing all incoming packets through a server, causing both an increased travel time for the data packets, as well as latency (or disconnection) for the time that the real IP address changed, but the server is not informed yet. If the round-trip-time of the packets between the STA and the server is longer than the time a STA stays with the same IP, this method fails, as by the time packets reach the reported location of the STA, the STA is already in another location.

For many applications, such as voice, it is of utmost importance to minimize the time spent on the handover process. The time consumed by the handover process is usually dominated by the scanning step (Step 1 as mentioned above), and by Step 4 (specifically in case of an unmanaged network). There are many solutions that address fast handovers in cellular networks, and a few solutions that address fast handovers in managed WiFi networks (for example, see: WO2004/054283, which reduces Step 1 (mentioned above) by selective scanning but requires modifying the AP). None of these solutions deal with the delay due to Step 4.

It is an object of this invention to provide very fast handovers even in unmanaged networks.

Another barrier for wireless applications is that WiFi coverage might exists, and security policy might allow the STA to connect, but the AP might be out of resources (for example, there are 2007 associated STAs, and therefore it has no resources left, or that it has a limited IP address space which was already allocated through DHCP, and it has no IP address to allocate). It is an object of this invention to provide a system and method that allows STAs to use the services of the AP even when some of its resources are exhausted.

Another barrier for many wireless applications is the complex configuration of wireless parameters of STA, especially the security parameters. A user that purchases a new STA and has an existing AP, might wish to configure his new STA to work with his AP. This configuration includes entering into the STA the encryption key and authentication key that would allow it to use the AP. Existing solutions require a change in the AP and STA, such that a special key can be pressed simultaneously at both ends to perform automatic Configuration (like Buffalo INC's AirStation OneTouch Secure System—AOSS, or Broadcom's SecureEasySetup). Without such a solution, the user is usually forced to punch into his STA the security codes (which are typically long). The problem worsens when the STA moves between APs that use different security settings.

It is an object of this invention to provide for easy configuration on both levels: at the initial setup and while roaming.

Another barrier for many wireless applications is that WiFi coverage might exist, but it is locked and unavailable for use for the STA. It is an object of this invention to provide a solution for (legally) accessing locked APs.

Another problem with WiFi is that the WiFi protocol is not optimized for low battery consumption (compared to cellular protocols such as GSM). In current solutions, if the STA moves between APs and changes its IP, it must use mobile IP and inform an entity (server) in the network of its current IP (we refer to this process as "location update", as the STA updates the network entity of its location). Frequent location updates exhaust the STA's battery. Another problem with frequent location updates is that they create a heavy load on the network and on the network entities that manage and keep track of the STA's location.

The situation in WiFi is very different from the situation in cellular networks in two ways. Both of the ways cause an increase in the number of location updates in WiFi: First, in cellular network, the cells are typically much larger than a "cell" that is created by a WiFi AP. Therefore, in cellular networks, there are fewer transitions between cells, and hence less location updates. Second, cellular protocols allow defining a "location area" that encompasses several cells, and the STA is required to perform location update only when moving between location areas, and thus reducing the number of location update. Current WiFi protocols are not built to support location areas.

It is an object of this invention to provide a method that reduces the number of location updates required for STAs while moving between APs.

It is an object of the current invention to provide solutions to the above mentioned problems, using both a centralized (server based) approach, and also by providing a method for performing the solutions using a distributed peer-to-peer network. Therefore, no huge servers and no large investments are, required.

DISCLOSURE OF INVENTION

The invention is described by way of example, but it should be obvious to persons skilled in the art that many variations thereof may be implemented.

A novel aspect of the invention relating to the deployment of APs is that devices function at the same time as STAs and as APs. This allows a STA to also create a new AP for connecting other STAs to the Internet therethrough. It is known in the art that a STA wireless card can operate in one of two modes, STA or AP. The present inventor has found a wily to activate a device simultaneously in both modes.

According to another novelaspect, a connecting STA can limit the set of Internet addresses or internet sites that other STAs which connect through it can access, but the set of allowed addresses includes a special web site from which other STAs can download the Vagabee™ software. Vagabee software includes the functionality of the software of the first STA, to open new APs and further spread the Vagabee.

Once the new STAs download and execute the Vagabee software, the first STA detects that the software is running on the new STAs, and allows them a wider access to the internet. Therefore, new STAs must download and run the Vagabee software to get wide access to the internet. As the new STAs run Vagabee, they become APs in their own right and allow other STAs to download and connect through them to the internet in the current location of these STAs, as well as in any other location they go.

Another novel method of the present invention allows a STA to connect through two or more APs simultaneously. Thus, a STA can enjoy a more stable connection even if part of the connections are of borderline quality. Furthermore, more connections may achieve a broader connection to the Internet, or may balance its traffic such that each STA carry a lighter burden with regards to the extra bandwidth they carry due to a new STA.

Multiple connections also allow faster handovers, as if a STA is moving from one place to the other it can first establish a new connection and then the old connection is terminated, practically leaving the STA connected.

In a further development of the novel method, a laptop (the terms STA and laptops are interchangeable, we use laptop rather than STA as in the preferred embodiment these cases the STA would be a laptop) can connect with another laptop directly or through a STA, such that both enjoy the Internet connection of the other. As the internet connection is not used all the time (typical laptop uses on average a few percents of its maximum bandwidth), both laptops will experience a much faster connection to the Internet.

Another important issue is the security of the system. A Laptop might agree to act as an APs, but it does not agree to allow other STAs to access its inner network (i.e., the laptop owner wishes to allows these STAs to access the internet through its private network but does not allow them to access computers on its private network. Another security-concern is that the new STAs may desire to prevent the first STA from tapping into their Communications, i.e., they do not want the first STA to be able to tap into communications that the first STA relays. The current disclosure provides novel method to deal with these two problems.

First, external STAs (new STAs) are not allowed access to computers in the inner network by having the first STA drop data packets from the external STAs that are designated to local IP addresses on the inner network. Second, a new STA's privacy is protected by tunneling its sensitive traffic to a trusted network site, and the new site accesses the Internet through his tunnel to the trusted network site which acts as a proxy for it.

An important issue is to prevent STAs from using other laptops for their primary network connection for a long period of time. A novel method detects that a STA is connected to the internet through the same laptop for a long period of time, and disconnects the STA. Alternatively, the STA has to pay to continue and use the network. The pricing can be such as to encourage the STA's user to purchase his own connection from an independent Internet Service Provider (ISP).

In yet another novel method, the software running on a laptop can replace the commercial banners that appear in the web pages the laptop surfs into, as well as the web pages that connected STAs surf into. The banners can be stopped, replaced, and made specially targeted to the user, for example based on his location.

A further novel method is that the wireless internet coverage that is obtained using laptops can be used by devices such as wireless IP phones to make phone calls using the wireless internet coverage, cellular phones that have built-in WiFi connection, or digital cameras with WiFi that wish to upload the data stored in them. Other devices might include for example, radio or TV broadcast capabilities.

For example, Digital cameras might be equipped with WiFi. The owner of such a camera would like to upload his pictures from the camera to a server that stores the pictures on the Internet—the reasons for this may vary from being able to share the photos while on vacation with family members left at home, backup the pictures from the digital camera to the Internet server, or simply because the memory card on the camera is running out of space. A major problem is that to upload the pictures to the Internet may take a very long time, as pictures consume megabytes to store. In the novel method, the camera can send the photos to the laptop over WiFi (this connection is very fast), then disconnect and move on. Then, the laptop uploads the pictures to the Internet server (this process can take a long time as it involves uploading a lot of data), but the laptop owner would not feel it as a burden, since the pictures can be uploaded when his Internet connection is not used for other purposes.

Improvements to this method may include: The camera can encrypt the pictures so that the laptop owner cannot see them. The pictures can be still stored in the camera after being uploaded to the laptop, as the laptop might fail to upload them. The next time the camera connects to the Internet, it can check with the Internet server that the pictures arrived correctly to the server. If that is so, the pictures may be erased from the camera. Otherwise, the camera can re-transmit the pictures.

To have faster uploads, the camera can upload the pictures to several laptops that would upload the picture to the server.

Another novel method relates to configuring STAs to connect to a wireless network. The configuration, and especially the security configuration of STAs to connect to a wireless Internet connection such as WiFi is cumbersome and annoying to most users. Assume a STA belongs to the same user (or user group) of the owner of a laptop. Then, by a special logging into a website, the configuration of the laptop can be copied to the STA, thus configuring it to use the AP (i.e., allowing a connection without the laptop).

Another novel method allows devices with a trusted hardware to receive information that instructs them how to directly connect to AP, by providing them with the needed settings and security information.

One of the novel aspects of a very fast handover is to practically "almost complete" the process of the handover before it even started, possibly with the assistance of another STA that is already in the new AP's coverage (further details are described later).

Another novel aspect is that the same MAC address and IP address can actually be used by more than one STA. The differentiation between the STAs can be performed by using higher protocol identification, such as different port numbers (for example TCP ports), as detailed later.

It is useful for a station STA to know the identity of the adjacent APs that the STA might hand over to. The identity of an AP can be established in several ways, as disclosed herein. The SSID (Service Set ID) of the AP is usually broadcasted by the AP using periodical transmissions known as beacon. However, two adjacent AP may have the same SSID. In such a case, the MAC address of each AP is different, and APs can be differentiated based on their MAC address (which serves as a globally unique identification parameter). Some APs do not transmit beacon, and only respond when they are addressed using their SSID. In this case, a priory-knowledge is needed, see below.

Another aspect of the invention is for a STA to selectively scan for a neighboring AP in the following novel way. Assume that a STA scans to see if it can receive the beacon of a second AP, where the scanning will be performed exactly when the second AP is expected to transmit its beacon, therefore, the disconnection from the first AP will be minimal. The novel method consists of scanning and storing (in network entities) information about the relative time between adjacent APs, and their relative clock drift. This information is retrieved at the appropriate time such that the STA knows to wait for the beacon just before it is transmitted.

Another aspect of the invention is to prevent exhaustion of resources at the APs. GN keeps a pool of MAC addresses with associated IP address. Just before a STA enters the AP, GN sends it a MAC address and an IP address that are already associated with the AP. Therefore, the STA can connect even if the AP has no resources left for new STAs.

Another novel aspect of the invention is to save Battery Power and reduce network load by reducing the number of Location Updates in WiFi. A location update is the process in which a STA informs an entity in the network on its current location (the notification can take many forms, including opening a TCP connection, or sending UDP packets). In prior art for 802.11 networks, a location update is required whenever the IP address of the STA changes (for example, when moving between APs of different subnets)—even if the STA is idle (not transmitting or receiving data). The novel method allows to define a location area for WiFi, such that an idle STA needs to perform location update only when it moves between APs that belong to different location areas, but does not need to perform location update when it moves between APs of the same location area, even if its IP address changes. See further details later.

A pseudo-beacon is another aspect of the invention which allows reducing the number of Location Updates. It is a message that GN can periodically transmit in each AP. While some APs might permit a remote node to transmit a message in the AP, other APs might not allow it. In the novel method, a certain MAC address, IP address, and possibly a port number, are allocated in each AP for the purpose of pseudo-beacon transmission. Further details are described later.

Configuring the security in new STAs to work with an existing AP might be a tedious job, as the security (authentication/encryption) code might be very long as known in the art, and the user might need to punch it into the STA. A novel solution for easy configuration is disclosed. Unlike previous solutions, the novel method does not require changing the existing AP of the customer. In one embodiment, software is rm on a personal computer of the user (that is already configured to access the WiFi). Then, the software establishes a secure channel with the STA, and copies the security information from the personal computer to the STA. In this way, the STA learns the security parameters. An authentication phase in which the STA is authenticated by the software or a remote server can be added before copying the security information.

In another embodiment, the customer first connects the STA by wire to its network (or alternatively, the STA first connects using a connection it establishes through an already connected device, such as a personal computer or laptop). As the STA can receive and transmit signals on the wireless network and it is connected to the interne (through the other connection) at the same time, it tries to locate the web configuration of the AP on the wired network (most APs have a web interface). In most cases, it is an easy job for the STA, as either the STA can locate the AP as it is the default gateway of the wired network, or it can try to find its IP by performing RARP (Reverse Address Resolution Protocol) using the wireless MAC address of the AP (which it can see off-the-air). Further details are described later.

Another novel method for gaining access to locked networks is disclosed. While performing the above described easy setup (or at any other time), the user is prompted, if he wishes, to join a swapping service. The swapping service allows the user to gain access to many locked networks (the locked networks of the other users that joined the swapping service), in return he allows users to use his network for the purpose of connecting to the Internet. If the user agrees, the access parameters to his network (encryption key, MAC address, default gateway, etc.) are securely stored in the network (for example in GN, and a backup server). The security information will be securely sent directly into the hardware of other STAs, when they need to connect using his AP. Further details are described later.

Another novel aspect of the invention takes advantage of the fact that the wireless network is local in nature, as the APs are geographically adjacent. As a result, the methods that are disclosed can be implemented by many small devices on the Internet, each responsible for a geographic area. The devices form a peer-to-peer network that implement the methods, without the need to rely heavily on large servers.

Another novel aspect of the invention is to have a STA which has a capability of communicating in two or more channels in parallel. This capability can enable a STA to be connected to two APs in parallel without the need to implement sophisticated mechanisms that actually simulate this situation. Thus, a STA can connect with future APs while maintaining a connection through its serving APs. Being connected to two APs simultaneously allows greater bandwidth by utilizing two connections instead of one; and soft-handovers, i.e., the STA stays connected through one AP, while disconnecting from the second AP in the process of handover.

The new system and method refers, among others, to the following innovative features:

1. A Viral-Like Fast Spread Method for the Vagabee™ Software:
   at the network level
   at the already connected PC
   at a connecting PC, already having the Vagabee software
   at a connecting PC, not yet having the Vagabee software
   details of the software package being loaded on a new computer: functions, operation, how installs, how spreads further away to other PCs.

2. Detail the Viral Spread Method:
   use of existing standards; "as is" or with modifications
   method of reporting to user and getting a user's approval
   interaction with firewall and antivirus programs in the PC 3. Vagabee in Use, with Flow Charts:
   manage communications with presently connected PCs
   add new PC
   remove a PC Recover chain, reestablish communications when intermediary PC disconnects
   resolve conflicts where there are several Vagabee systems in one area.
   Method of operation, so the networks will not interfere with each other, rather they may assist each other and maybe provide backup functions.
   Knowing the identity of adjacent APs and the location of STAs.
   handoff to another local Vagabee network 4. Vagabee in Use, System Design:
   workload on the various PCs in the chain (the workload increases as one moves closer to the AP, the Internet connection)
   overhead, signaling and control, traffic control. Define signals, method of operation
   permission to access more sites on the Internet after a new PC downloads and activates Vagabee—how implemented.
   reliability issues 5. System Design for Various Configurations
   The basic assumptions greatly affect the performance of the network systems which may be formed:
   a PC connects to only one additional PC
   a PC may connect to one or two additional PCs
   a PC may connect to more than two additional PCs 6. Bandwidth Control
   Bandwidth request and allocation. For the various PCs in the chain.
   Methods for improved channel use. How is implemented.

7. Privacy Issues—how the Inner/Outer Areas are Implemented:
   Protection from viruses and eavesdropping, passwords protection, etc.
   Damage control, Recovery from a virus attack.
   This is a vital aspect of the new technology.

8. User Control and Supervision
   the user of a PC decides whether to install Vagabee
   the user of a PC decides whether to allow additional users to connect, with what parameters (bandwidth allocation, etc.)
   incentives for a user to allow his computer to connect others.
   the user allows or forbids additional users, according to circumstances—how important his present activity is, what is the quality and bandwidth allocated to that user (how much spare bandwidth there is)

9. Details of Implementation—Software
   New software
   Modified existing software
   Method of use of existing software, standards 10. Functions, Benefits to Users—Detail Methods to Implement them
    free internet connection
    enhanced bandwidth, reliability
    provide additional services—locate gas stations, Pizza Hut, restaurants.

BEST MODE FOR CARRYING OUT THE INVENTION

A preferred embodiment of the present invention will now be described by way of example and with reference to the accompanying drawings.

Dual Use Laptop Simultaneously Connected to the Internet and Serving as AP

Figure 1:
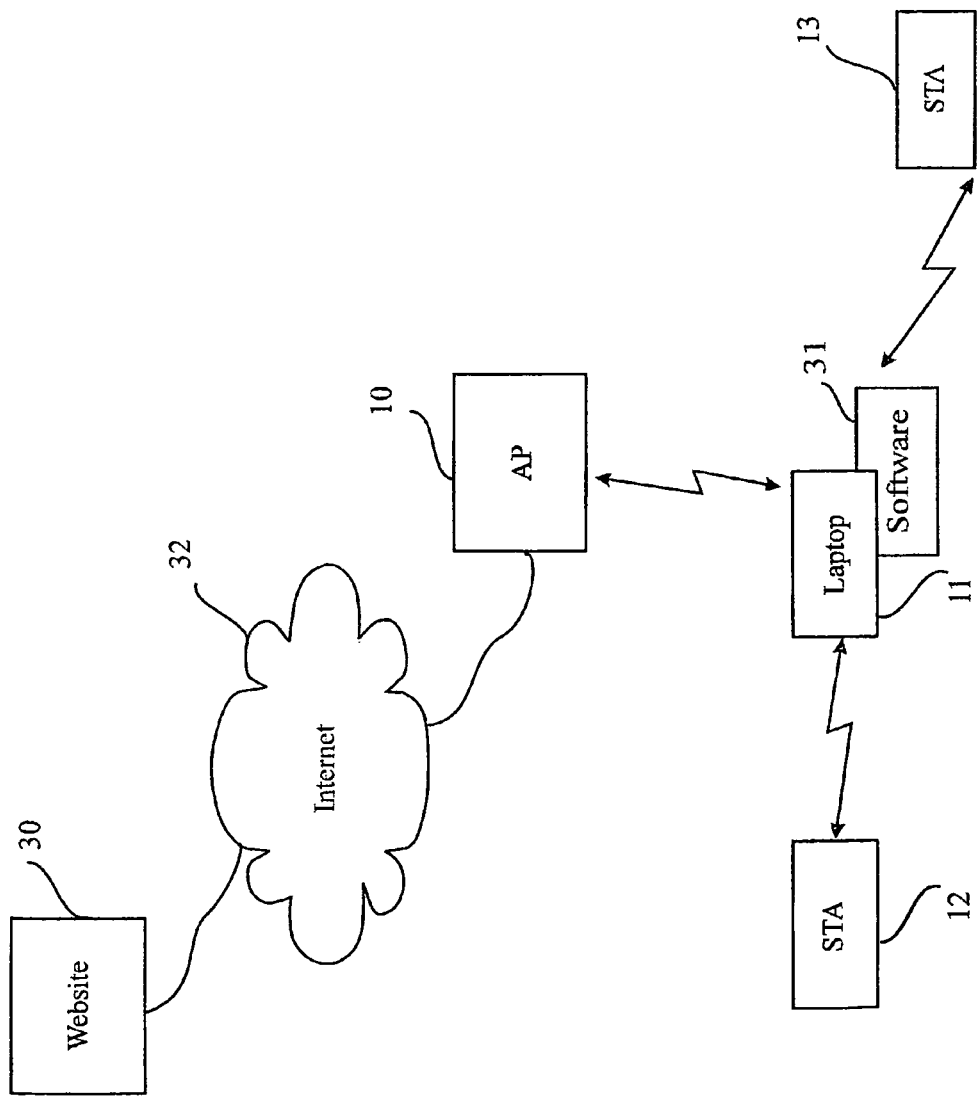
FIGS. 1 and 2 illustrate a wireless system for connecting mobile devices to the Internet through an access point
Figure 2:
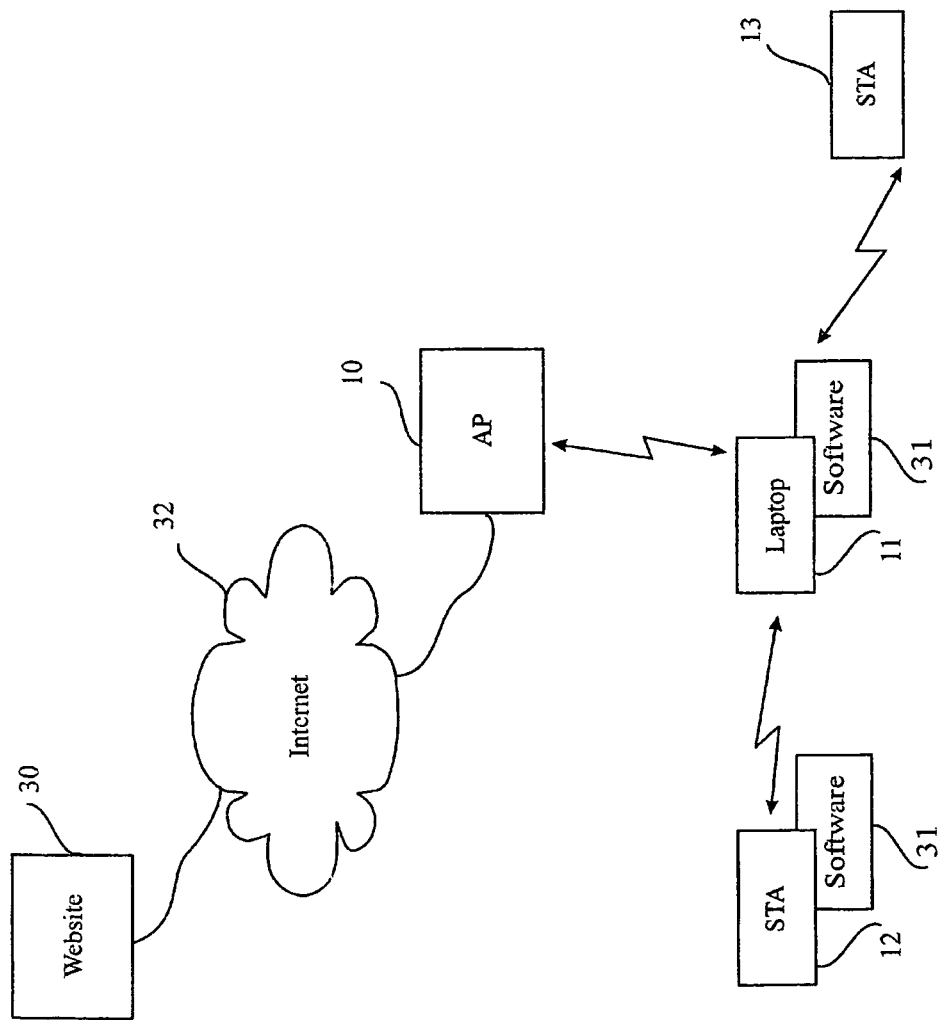

FIGS. 1 and 2 illustrate a wireless system for connecting mobile devices to the Internet through an access point. It may use a novel method for performing the deployment of APs, i.e., the method that allows devices to function at the same time as STAs and as APs. For example, a laptop 11 is connected to the Internet through access point AP 10, and at the same time, laptop 11 shares its connection for other STAs by operating as an AP. Thus, other STAs 12 and 13 look at laptop 11 as an AP, and can connect through it to the Internet.

When laptop 11 is connected to AP 10 through a wired connection, it can simply set its wireless connection as an AP (Infrastructure mode). However, when laptop 11 is connected to AP 10 through a wireless connection, the situation is more complex. Disclosed is a novel method in which laptop 11 can be connected to AP 10 and serve as an AP using only a single wireless network card. Laptop 11 connects to AP 10 just like any other STA, and at the same time runs the protocol stack of an AP.

Laptop 11 uses the same channel as AP 10, and transmits a beacon message such that the beacon of AP 10 and the beacon of laptop 11 are expected not to collide in time. Laptop 11 derives and updates its internal clock from AP 10, but adds a constant delay (to make his beacon appear with a delay after AP 10).

In another embodiment, laptop 11 does not add a delay to the time of AP 10, but sets the beacon period to a value, such that the greatest common denominator (GCD) between its beacon period and the beacon period of AP 10 is the smallest that is possible. Such a choice of beacon period ensures minimal collisions between the beacons.

In the preferred embodiment, laptop 11 will run a Network Address Translation (NAT) and a DHCP server as part of his protocol stack. Running DHCP enables laptop 11 to provide an Internet address to STAs that connect to it. Running a NAT allows laptop 11 to connect other STAs through it, while keeping conformance with regards to AP 10-To AP 10 all the communication appears to be originating form laptop 11.

The software package 31 may be contained in the laptop 11, or in the laptop 11 and the STA 12, for example.

Viral Spreading

Many networks suffer from the network effect in their infancy, in which the first users have no incentive to join the network. However, the network is of great value once many users are in the network.

The following method and system attracts the first users, and provide an increasing value as the network grows. The first very few laptops with the software are installed and deployed in key areas by the network initiator. The software running on the laptop 11 has functionality 31 as follows (explained through an example):

Laptop 11 acts as an AP and allows other STAs to connect to it. To further lure STAs, the SSID (Service Set Identification—this is the name of the network that users see when looking for an available network) can be set to "Free Internet" or another name that will attract roaming laptop users to log-into it while searching for wireless networks.

Assume a user using a laptop called STA 12 connects as described above. Once STA 12 is connected to the laptop 11 (laptop 11 serves as an AP), no matter which web site the user tries to enter, the software 31 on laptop 11 forwards the connection to a special web site 30. The web site 30 informs the user (STA 12) that, in order to use the free connection, it must install a software with functionality 31. The deal is that the user is allowed the free access at this location, but it is requested to share his own connection when he has one at his disposal. The user then downloads and installs the software with functionality 31 (See FIG. 1.B which shows software with functionality 31 running on STA 12. Once laptop 11 identifies that STA 12 has functionality 31 running, it allows it a wider access to the interne (or a full access to the public Internet).

Thus STA 12, which originally did not have functionality 31 running, but its user wished to connect to the internet, ended up with functionality 31 installed and running on STA 12, and the user received a working internet connection. When the user moves STA 12 to another area in which it connects directly to an AP (which might be locked), it shares its connection with other STAs, which are also motivated to install functionality 31. Thus, functionality 31 can spread quickly among STAs, and the total area that is served grows larger, where each additional STA spreads the network further.

Laptop 11 together with its software might need to use two different security parameters at the same time—one towards AP 10 (which might be locked), and open security towards other laptops—so they can connect with no security settings. Once functionality 31 is running, it can establish a secure connection with laptop 11 as a secure layer on top of the fundamental insecure wireless.

Connection Through Multiple Access Points

Figure 3:
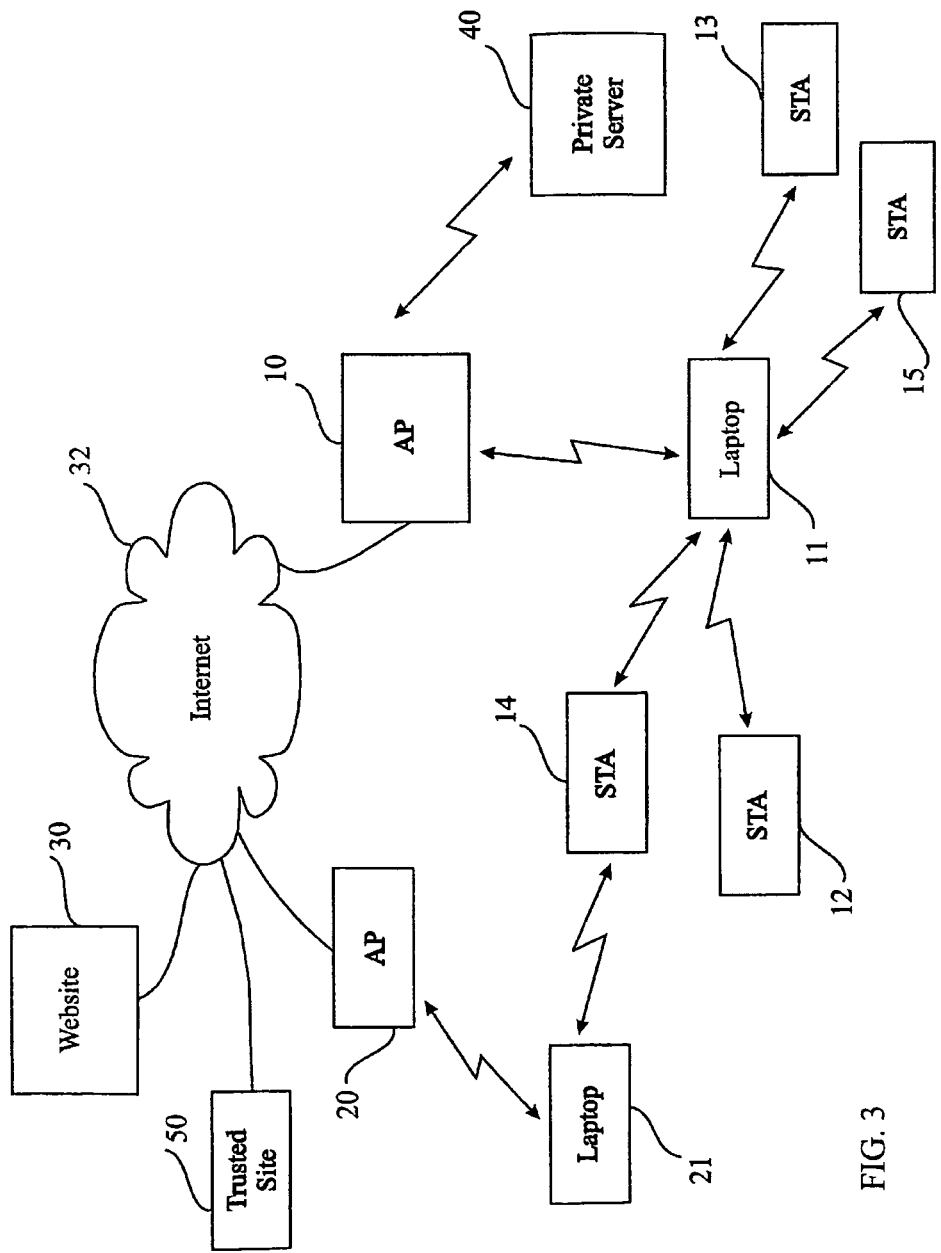
FIG. 3 illustrates an expanded wireless system for connecting mobile devices to the interne through more than one access point FIG. 4 details a method for fast spreading the Vagabee software by providing free wireless access to the Internet.

Another novel method of the present disclosure allows STA 14 to connect simultaneously through two or more APs, see FIG. 3. For example, STA 14 connects-through both laptop 11 and laptop 21 to the internet. Thus, STA 14 can enjoy a more stable connection even if both connections (through laptop 11 and 21) are in borderline quality. Furthermore, even in case the connections are not in borderline quality, they can be used to provide STA 14 a broader connection to the internet, or balance his traffic such that laptop 11 and laptop 21 carry a lighter burden per laptop with regards to the extra bandwidth they carry due to STA 14.

Multiple connections also allow handovers. When a STA is moving from one place to another, it can first: establish a new connection and then the old connection is terminated, practically leaving the STA connected.

When laptop 11 and laptop 21 use the same WiFi channel, STA 14 connects to both laptops by creating two protocol stacks on the MAC (Media Access Control) layer. When laptop 11 and laptop 21 operate on different channels, STA 14 agrees with laptop 11 and laptop 21 on period of times in which laptop 11 sends packets to STA 14, and periods of time in which laptop 21 sends packets to STA 14. STA 14 makes sure that these periods of times do not overlap, thus, STA 14 sets the channel according to the period, such that it listens on the channel of the laptop that might transmit to it. If the laptop has packets pending for STA 14 it queues them for transmission in the transmission period.

In order to have a faster connection through the two (or more) connections, STA 14 downloads/uploads some of the information through one connection, and the rest through the other connection. For example, when downloading a web page, STA 14 can download the text through one connection, and download the images through the other connection.

In another embodiment a remote site 50 with a fast Internet connection acts as a proxy of STA 14. Incoming and outgoing packets are forwarded between STA 14 and remote site 50. The packets are sent using error-correction codes that allow reconstructing the data even if some packets are lost on one connection, but some packets reach the destination using the other connections. The role of remote site 50 can be assumed by a service provider, by computer with a software that the user installs in his premise, or by another user with high bandwidth.

When the STA moves from one location to another, new connections are being established, while other connections are being disconnected. However, as long as there is at least one active connection, the STA will stay connected to the Internet continuously and seamlessly.

Sharing Internet Connection Between Laptops

When laptops 21 and 11 are within radio (wireless) contact (or through the mitigation of other STAs), each laptop can treat the other as another connection at his disposal. Thus, the maximum data rate available for each laptop can be significantly extended, much like the case with a STA connected to two laptops.

Figure 4:
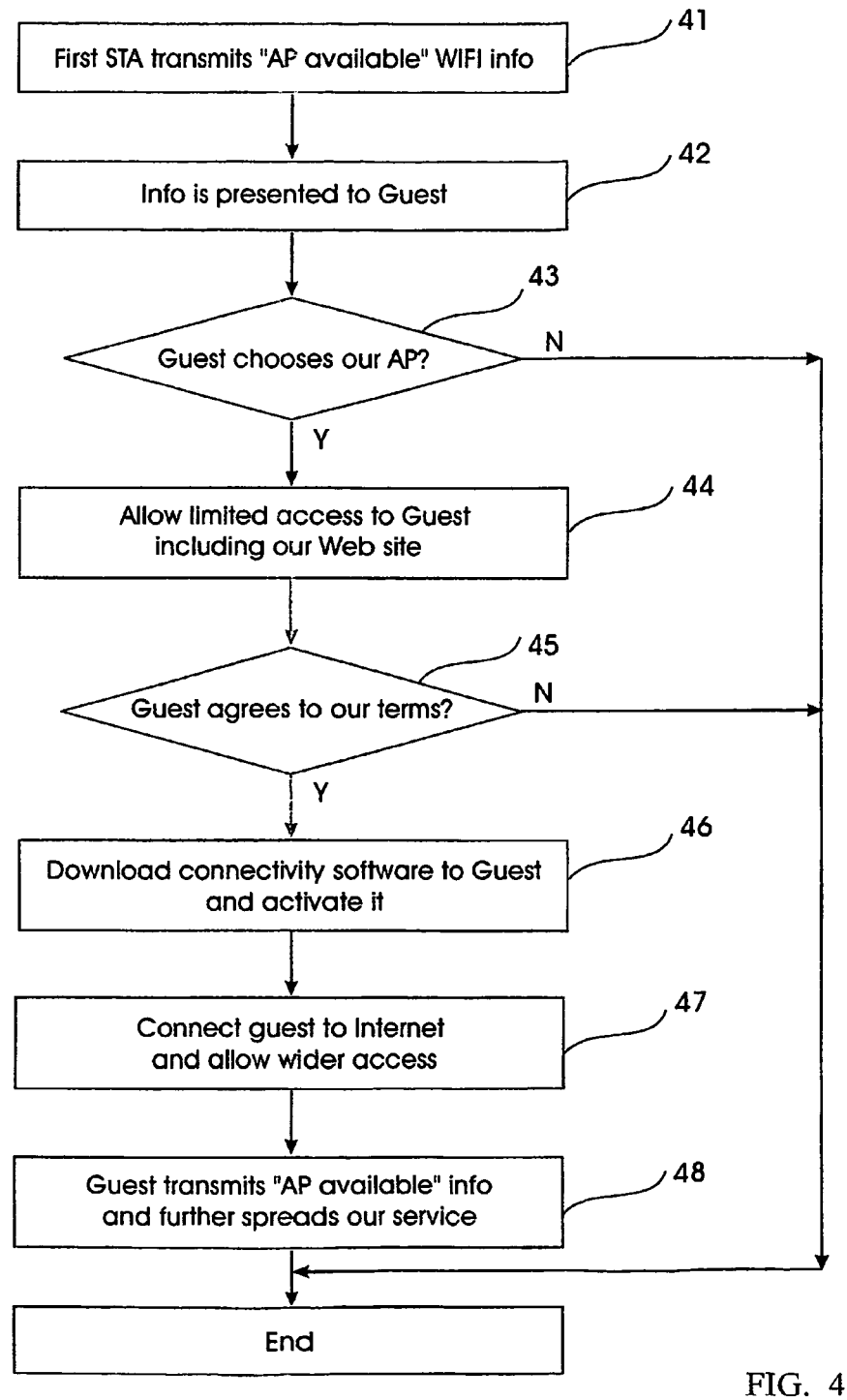

FIG. 4 details a method for fast spreading the Vagabee software by providing free wireless access to the Internet. The method includes:

a. First STA transmits "AP available" WIFI info 41
  b. Info is presented to Guest 42
  c. Guest chooses our AP? 43
  d. Allow limited access to Guest including our Web site 44
  e. Guest agrees to use our service? 45
  f. Download connectivity software to Guest and activate it 46
  g. Connect Guest to Internet and allow wider access 47
  h. Guest transmits "AP available" info and further spreads our service 48
  End of method

Note: It is not mandatory to perform all the above stages. The more important steps are 45-47 or any similar implementation.

Figure 5:
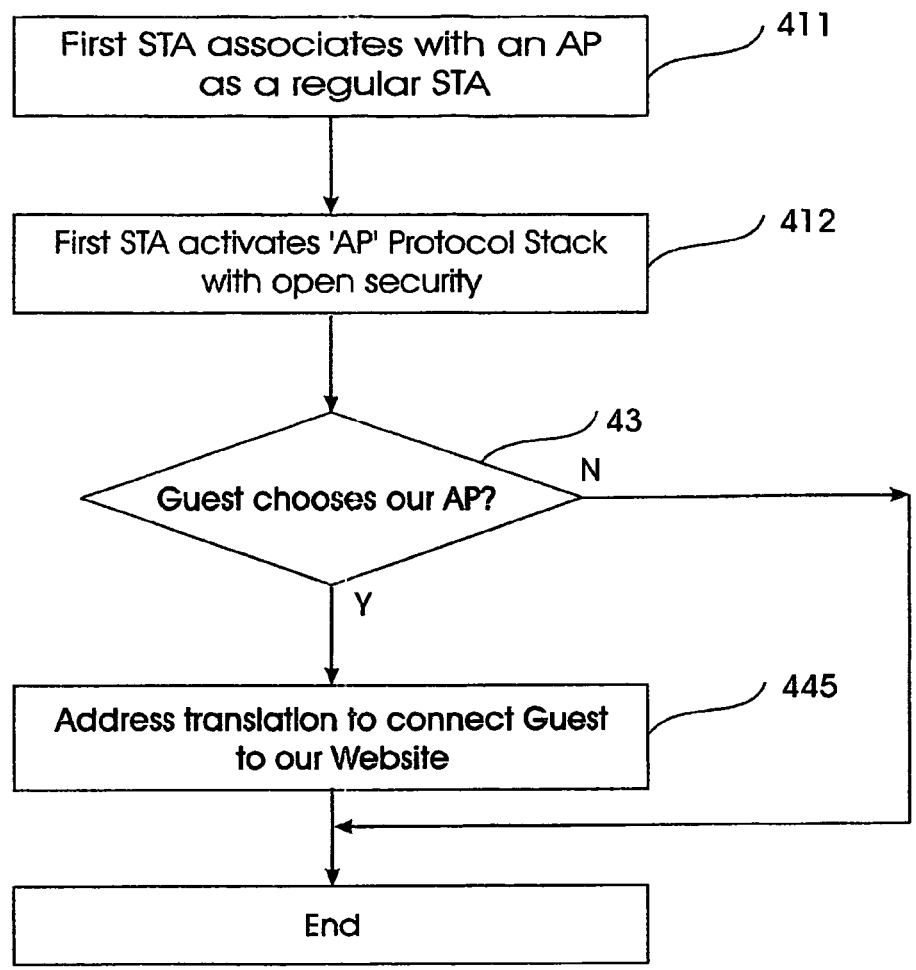
FIG. 5 details the dual mode connectivity of a STA also functioning as an AP with the Vagabee method and software FIGS. 6A to 6F, detail stages in a wireless network evolvement and spreading of the Vagabee software FIG. 7 details a method addressing control and security aspects of the Vagabee spreading method FIG. 8 details a method addressing coordination and control aspects of the Vagabee spreading method for the first, connecting STA FIG. 9 details multi-AP, fast configuration setting and handover aspects of the Vagabee spreading method for the second, to be connected STA FIG. 10 details multi-AP, fast secure configuration setting and redirection aspects of the Vagabee spreading method for the first, connecting STA FIG. 11 details multi-AP and fast configuration setting aspects of the Vagabee spreading method for the second, to be connected STA

FIG. 5 details the dual mode connectivity of a STA also functioning as an AP with the Vagabee method and software. The method includes:

a. First STA associates with an AP as a regular STA 411
  b. First STA activates "AP" protocol stack with open security 412
  c. Guest chooses our AP? 42
  d. Address translation to connect Guest to our Website 445
  End of method

The above method has been implemented by the present inventor on a communication device using the Intel 2200 chipset, just as an example to show that it can be done. The present inventive approach and method may be used towards similar implementations with other communication devices.

Figure 6C:
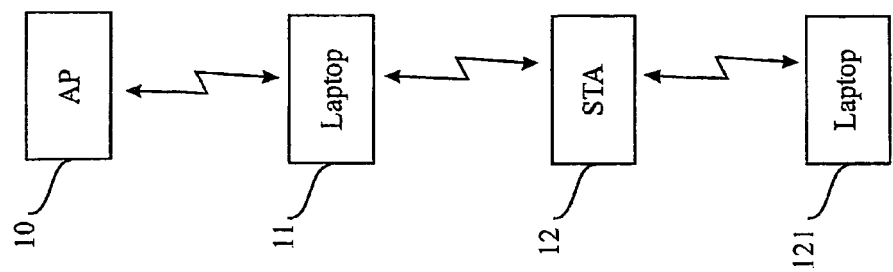
Figure 6B:
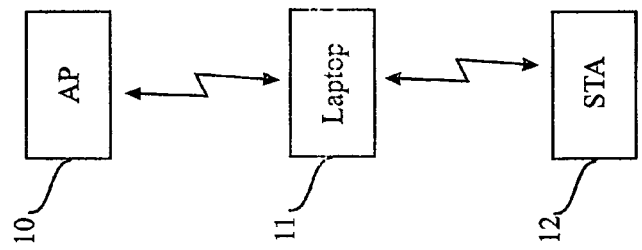
Figure 6A:
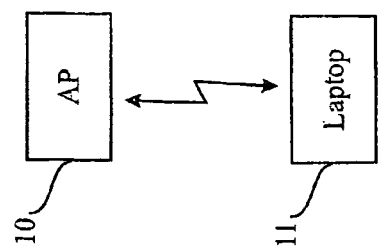

FIGS. 6A to 6F detail stages in a wireless network evolvement and spreading of the Vagabee software, including:

FIG. 6A: There is a Laptop 11 connected to the internet by wireless through the access point AP 10.

FIG. 6B: The Laptop 11 also functions as AP using the Vagabee software, thus allowing free access for STA 12 through Laptop 11.

FIG. 6C: STA 12 joined the Vagabee group, created a new AP to also connect Laptop 121. A long chain can thus be formed.

Figure 6D:
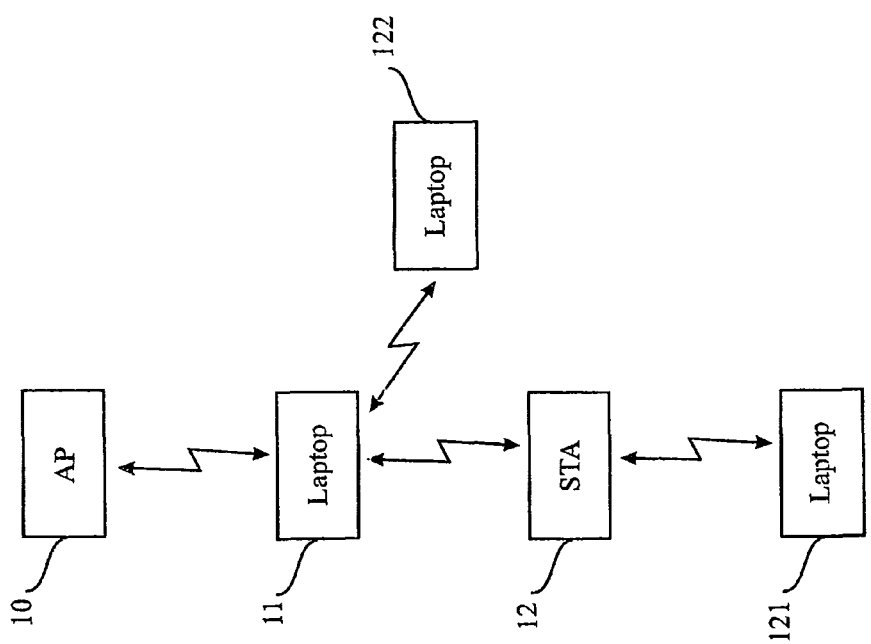

FIG. 6D: each AP can connect several new devices, as illustrated here with Laptop 122.

Figure 6E:
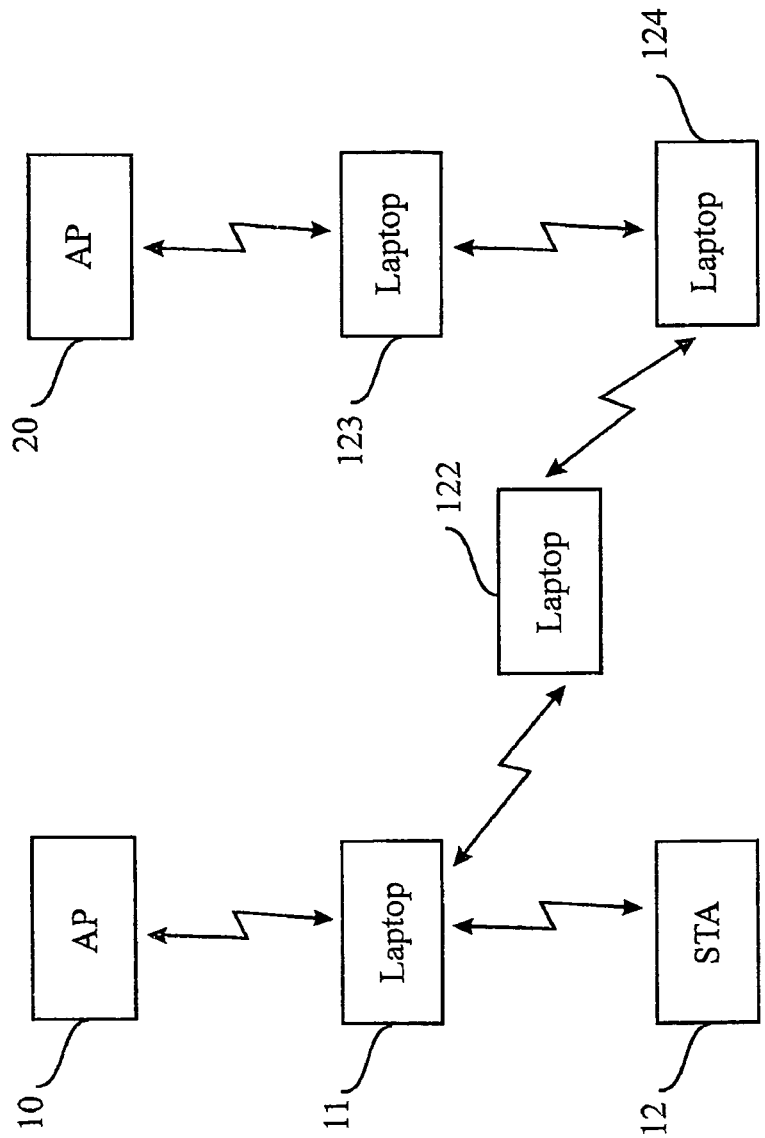

FIG. 6E: a multi-AP network may be configured, with a plurality of devices being connected through both AP 10 and AP 20. A device such as Laptop 122 can be simultaneously connected through more than one AP to the internet.

Figure 6F:
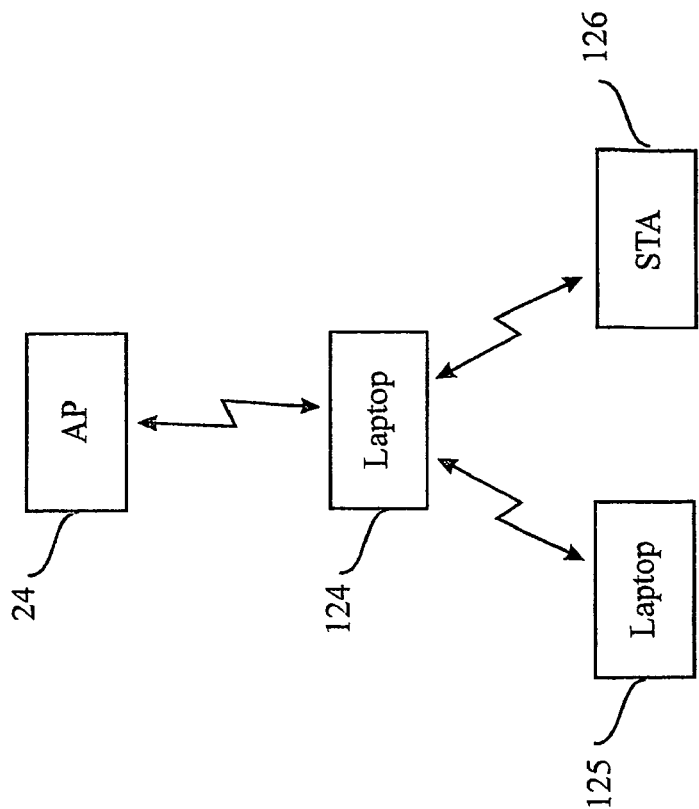
Figure 6F:
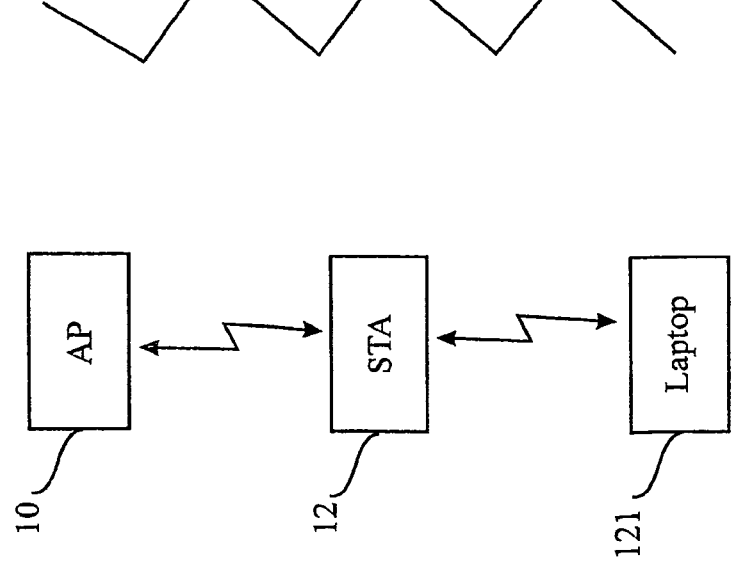

FIG. 6F: As the initiated device Laptop 124 moves to another location and connects to AP 24 (maybe it has a license or privileged access there, while Latop 125 and STA 126 cannot connect directly to AP 24 due to distance or lack of security parameters), the Vagabee software in device 124 opens a free AP at that location, now being utilized by Laptop 125 and STA 126 to connect to the internet. At a separate location, AP 10 may still operate and connect STA 12, Laptop 121 etc.

Security

Another important issue is the security of the system. Consider a situation (shown in FIG. 2) in which laptop 11 agrees to act as an APs, but it does not agree to allow STA 13 and STA 14 to access his inner network (i.e., it allows STA 13 and STA 14 to access the internet through his network but does not allow them to access computers in his network. For example, a private server 40 should not be accessible to them). On the other hand, STA 13 wishes to use laptop's 11 network, but might not wish laptop 11 to be able to tap into the data that STA 13 exchanges with Internet servers. The current disclosure addresses these two problems using a novel method. First, external STAs are not allowed to access to the inner network by not allowing them to access to local IP addresses. Second, STA 13's privacy is protected by tunneling its sensitive traffic to a trusted network site 50, and STA 13 accesses the internet through its tunnel to the trusted network site 50, which acts as a proxy of STA 13.

To prevent STAs from accessing the inner network, laptop 11 blocks all traffic from the guest STAs to internal addresses (i.e., addresses that appear only in local networks and not in the public internet, such as 192.168.*.*, or 10.*.*.*, and 172.16.0.0-172.31.255.255). Another method, which can be applied independently, is to allow the connection if it is at least x hops into the Internet, where x is the maximum number of hops in the local network (which can be discovered by performing a traceroute command). Another method is to allow access to addresses which have an IP address with a different prefix, as internal networks typically have the same prefix on the IP address.

In another method, laptop 11 allow only packets to and from known servers such as trusted server 50 (i.e., white listing the allowed addresses).

To protect the privacy of STA while it is surfing, its traffic can be tunneled to a trusted network site 50, which acts as its proxy. The network site can be replaced by simply tunneling the connection to another node in the network, and switching the network node once in a while. The access to the remote nodes is made without identifying the STA, but only proving that it belongs to the group of STAs, thus, its privacy is preserved. The frequent switching of remote nodes eliminates the possibility that a remote node can gather a significant amount of private information from peeking into the communication. The list of available remote nodes can be kept by a directory service, which can be distributed in a peer-to-peer fashion.

In another embodiment, the remote node is a trusted computer installed by the user. Such a configuration has the added benefit that the user can access internal nodes in his own private network, effectively having a Virtual Private Network (VPN) with his home network.

Figure 7:
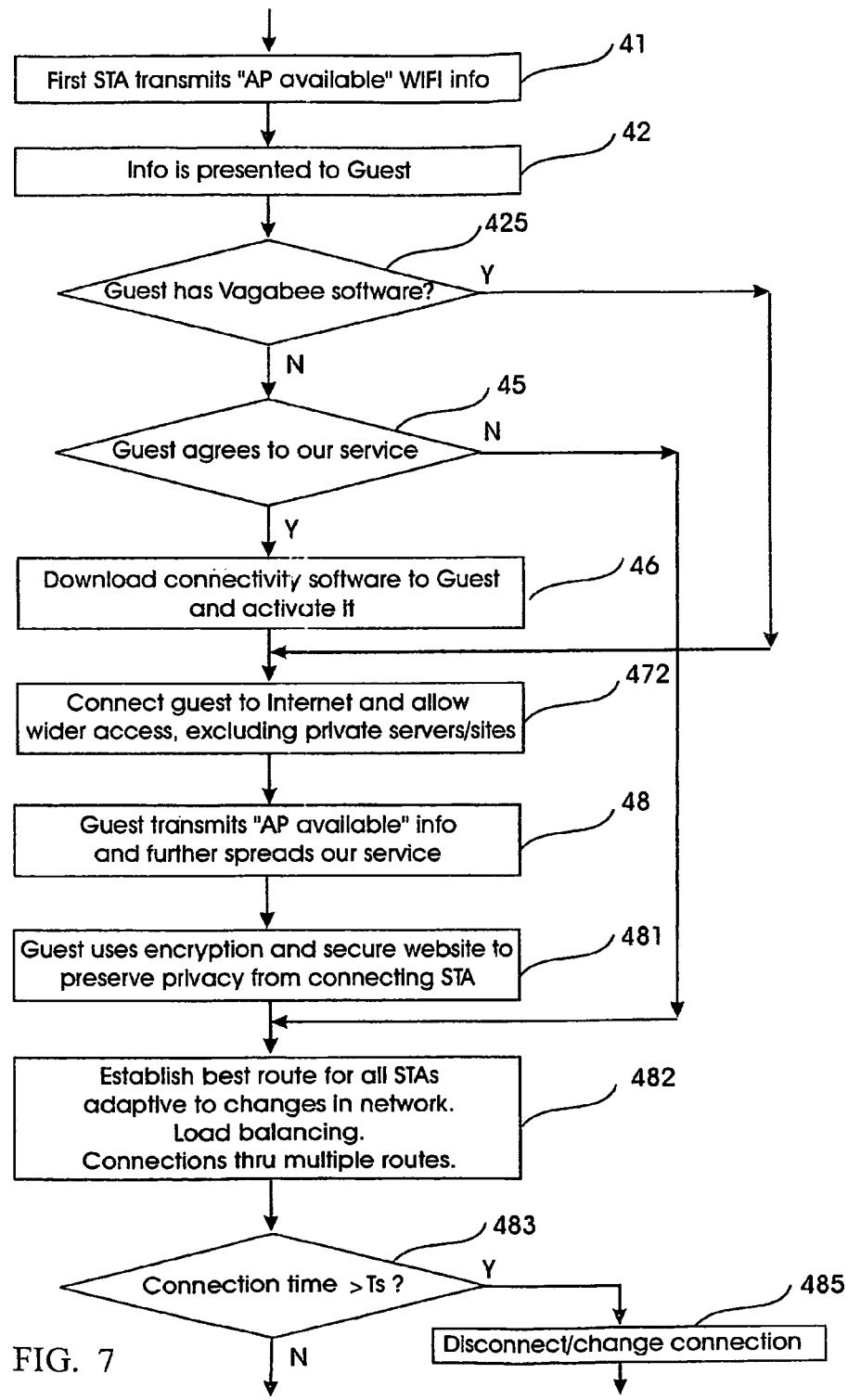

FIG. 7 details control and security aspects of the Vagabee spreading method including:
   a. First STA transmits "AP available" WIFI info 41
   b. Info is presented to Guest 42
   c. Guest has Vagabee software? 425
   d. Guest agrees to use our service? 45
   e. Download connectivity software to Guest and activate it 46
   f. Connect Guest to Internet and allow wider access, excluding private servers/sites 472
   g. Guest transmits "AP available" info and further spreads our service 48
   h. Guest uses encryption and secure website to preserve privacy from connecting STA 481
   i. Establish best route for all STAs 482 adaptive to changes in network.
   Load balancing.
   Connections thru multiple routes.
   j. Connection time>Ts? 483
   k. Disconnect/change connection 485
   *End of method*

Note: Not all the steps above are mandatory; a method may implement only part of the steps in the above method.

Maintaining Fairness

It is desirable to avoid an unfair situation in which one user exploits the network by continuously using a connection without ever sharing a connection. If many users follow these lines, the network experience will degrade as there will be only a small number of laptops connected directly to APs. A novel mechanism detects that a STA is connected to the internet by noting that the same STA (using the same laptop) connects from the same small area (or through the same AP) for a long period of time (i.e., beyond a threshold). For example, this threshold can be set to two weeks. Once a STA passes the threshold, the functionality 31 notes the user that the threshold is reached.

The user is then required to move to another area or pay a small fee to continue and access the AP.

Functionality 31 may note the user when the threshold is being approached, even before it actually reaches it. It can then give a pre-warning to the user.

The laptop is identified through his account information, through the MAC address of his network card, and other machine-specific information, such as the serial number of the hard-disk.

Figure 8:
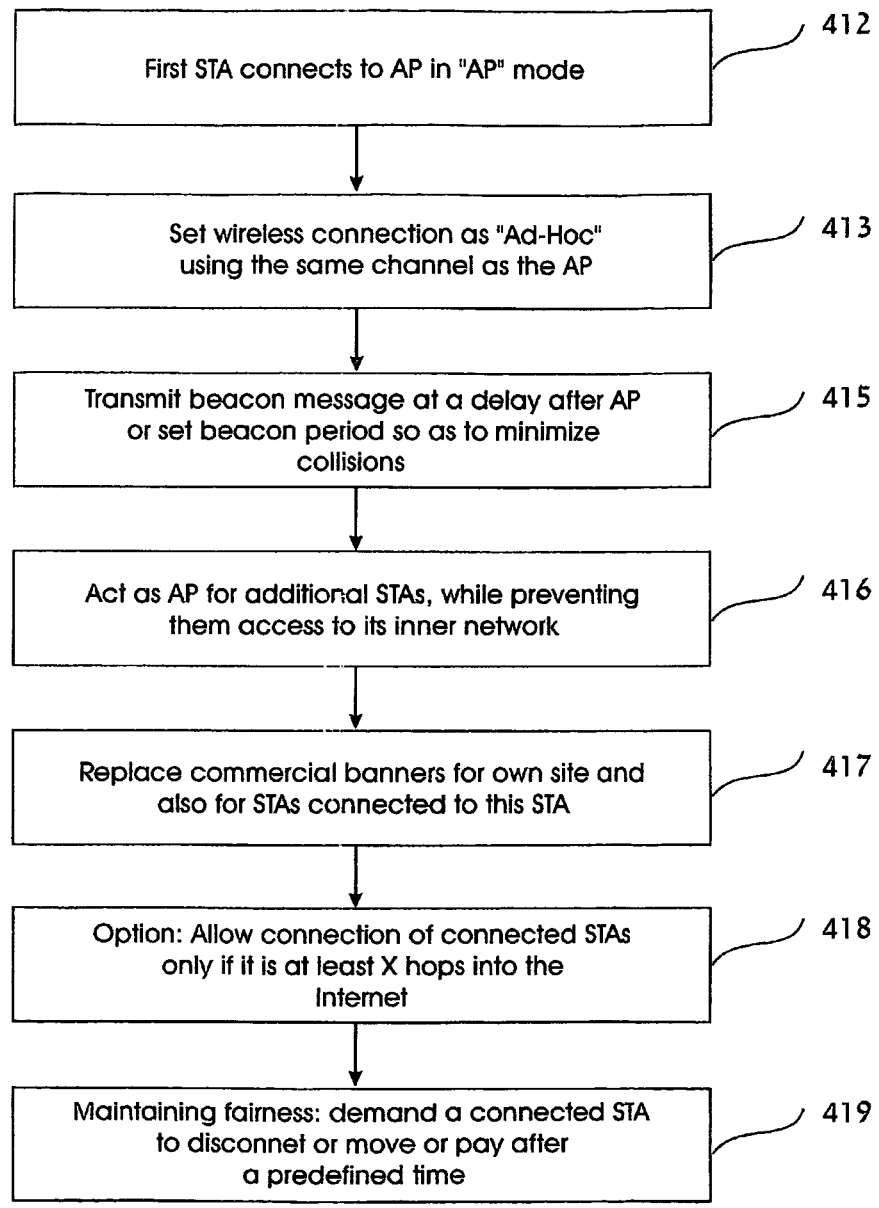

FIG. 8 details coordination and control aspects of the Vagabee spreading method for the first, connecting STA, including:

a. First STA connects to AP in "AP" mode 412
   b. Set wireless connection as "Ad-Hoc" using the same channel as the AP
   c. Transmit beacon message at a delay after AP or set beacon period so as to minimize collisions 415
   d. Act as AP for additional STAs, while preventing them access to its inner network 416
   e. Replace commercial banners for own site and also for STAs connected to this STA 417
   f. Security Option: Allow connection of connected STAs only if it is at least X hops into the Internet 418
   g. Maintaining fairness: demand a connected STA to disconnect or move or pay after a predefined time 419
   End of method

Figure 9:
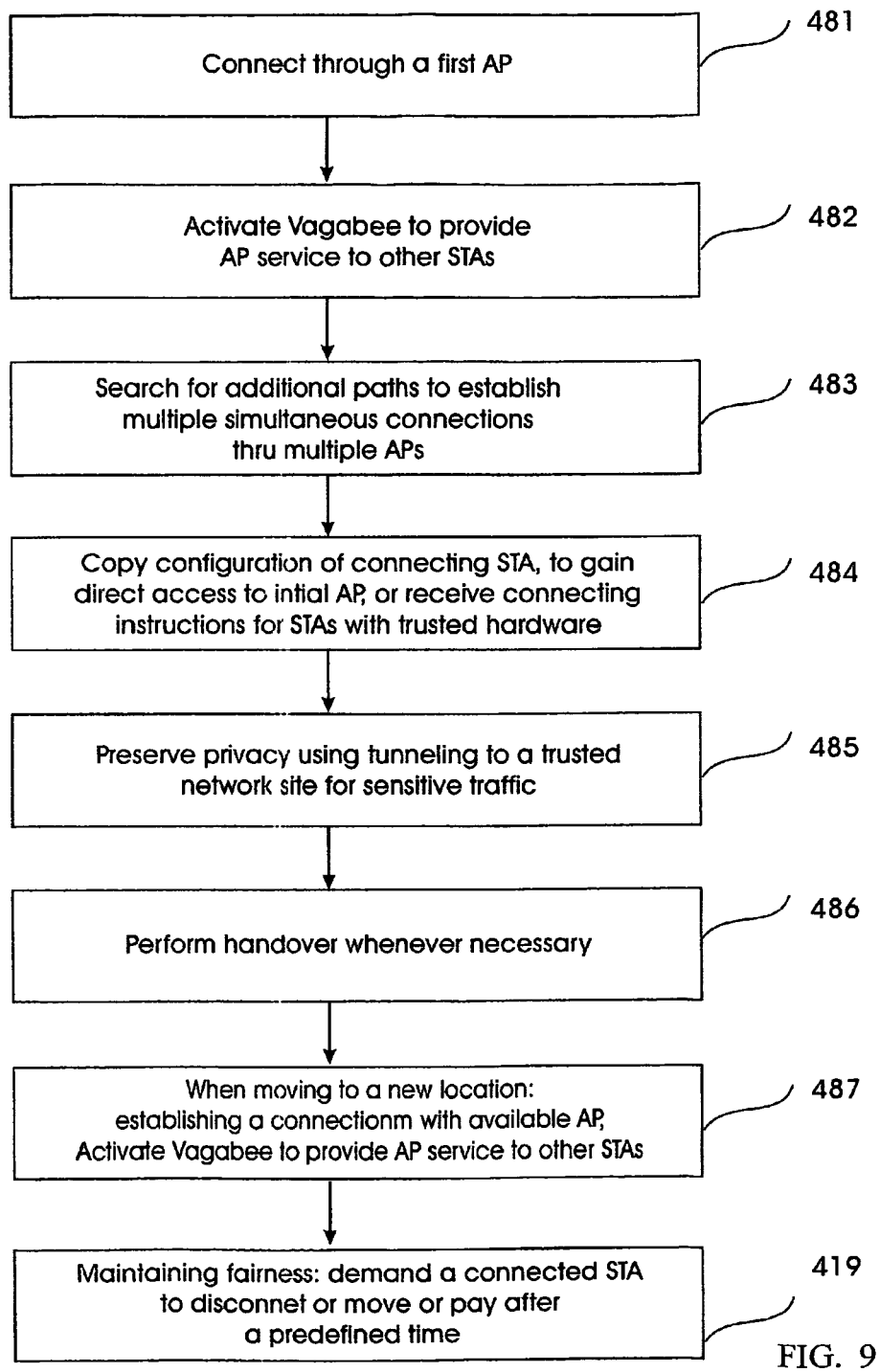

FIG. 9 details multi-AP, fast configuration setting and handover aspects of the Vagabee spreading method for the second, to be connected STA, including:
   a. Connect through a first AP 481
   b. Activate Vagabee to provide AP service to other STAs 482
   c. Search for additional paths to 483 establish multiple simultaneous connections thru multiple APs
   d. Copy configuration of connecting STA, 484 to gain direct access to the initial AP, or receive connecting instructions for STAs with trusted hardware
   e. Preserve privacy using tunneling 485 to a trusted network site for sensitive traffic
   f. Perform handover Whenever necessary 486
   g. When moving to a new location: 487 establishing a connection with available AP, Activate Vagabee to provide AP service to other STAs
   h. Maintaining fairness: demand a connected STA 419 to disconnect or move or pay after a predefined time
   i. Control over advertisements (optional)
   *End of method

In a novel method hereby disclosed, the functionality 31 can scan the web pages that pass through it and block or replace the advertisements on the page depending on various data such as the user name, the user location, etc. The advertisements can be performed in collaboration with the web site that is being surfed into, or without.

Note: the functionality (or software module) 31 is an important part of the present method, a minimum requirement to allow Xiopea™ spreading. Moreover, module 31 need not include all the possible things that this functionality can include, rather just the bare minimum directed toward allowing a connection to a STA in return to supporting the spreading of the this software.

The site 30 can instruct functionality 31 as to which advertisements should be removed or changed, and which advertisements should be placed. New advertisements can also be added in places that there were no advertisements to begin with.

The software 31 running on laptop 11 can replace the commercial banners that appear in the web pages that laptop 11 surfs into, as well as the web pages that STA 13 surfs into. The banners can be stopped, replaced, and made specially targeted to the user, for example based on his location.

Configuration of Wireless Networks

An annoying task associated with wireless networks is the configuration of a STA to work with a network. The security settings are especially annoying, and currently, many people avoid securing their network due to the cumbersome setting procedure.

A novel method is disclosed to perform easy configuration of a wireless settings. The method is composed of two parts, the first is establishing the settings for the first device, and the second part is establishing the settings for the rest of the devices. First part: Assume a user on laptop 11 is connected to his wireless AP 10. If AP 10 is not set to use encryption, the user can ask (or be offered) to secure his network. Functionality 31 automatically accesses the interface of AP 10 and configures it with security settings. Laptop 11 is also set with the security settings. The settings are also stored in an account in web site 30, for future use. Site 30 can also provide functionality 31 with the information on how to set the security setting on the specific model of AP 10.

Second part: When the user uses another device STA 12, he connects to the network through functionality 31 on laptop 11, which redirects him to web site 30. On the site, he can log-in using his account details. Web site 30, through functionality 31 which is running on laptop 11, discovers that the two devices (laptop 11 and STA 12) are both connected through AP 10, and both belong to the same user account. As a result, web site 30 offers the user to reconfigure STA 12 to work directly with AP 10. The user is advised to download functionality 31 to STA 12, and run it. Once functionality 31 is running on STA 12, it configures STA 12 with the settings of the network (which are retrieved from web site 30, or directly from laptop 11).

Figure 10:
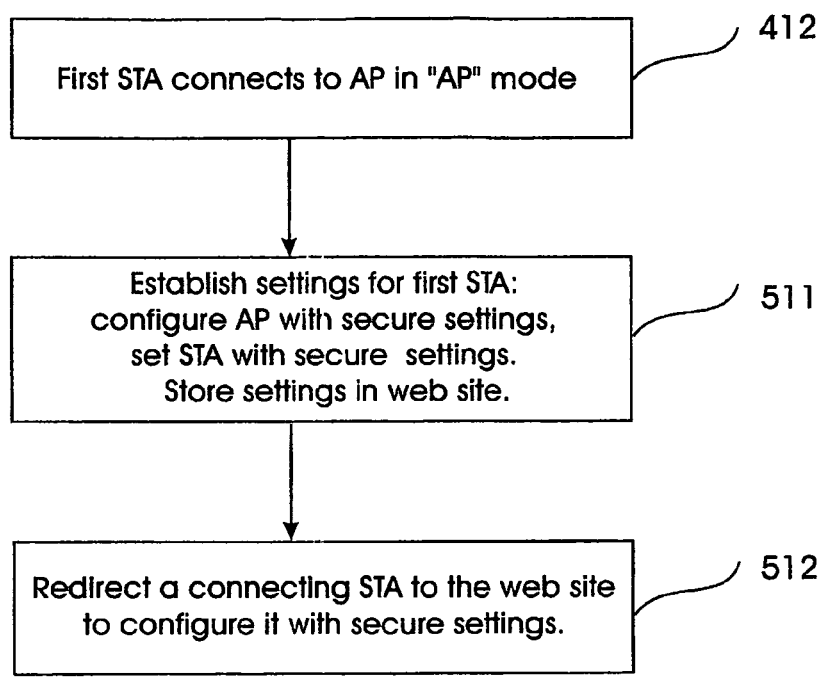

FIG. 10 details multi-AP, fast secure configuration setting and redirection aspects of the Vagabee spreading method for the first, connecting STA, including:

a: First STA connects to AP in "AP" mode 412 b. Establish settings for first STA: 511 configure AP with secure settings, set STA with secure settings.

Store settings in web site.

c. Redirect a connecting STA to the web site 512 to configure if with secure settings.

\*\*End of method\*\*

Figure 11:
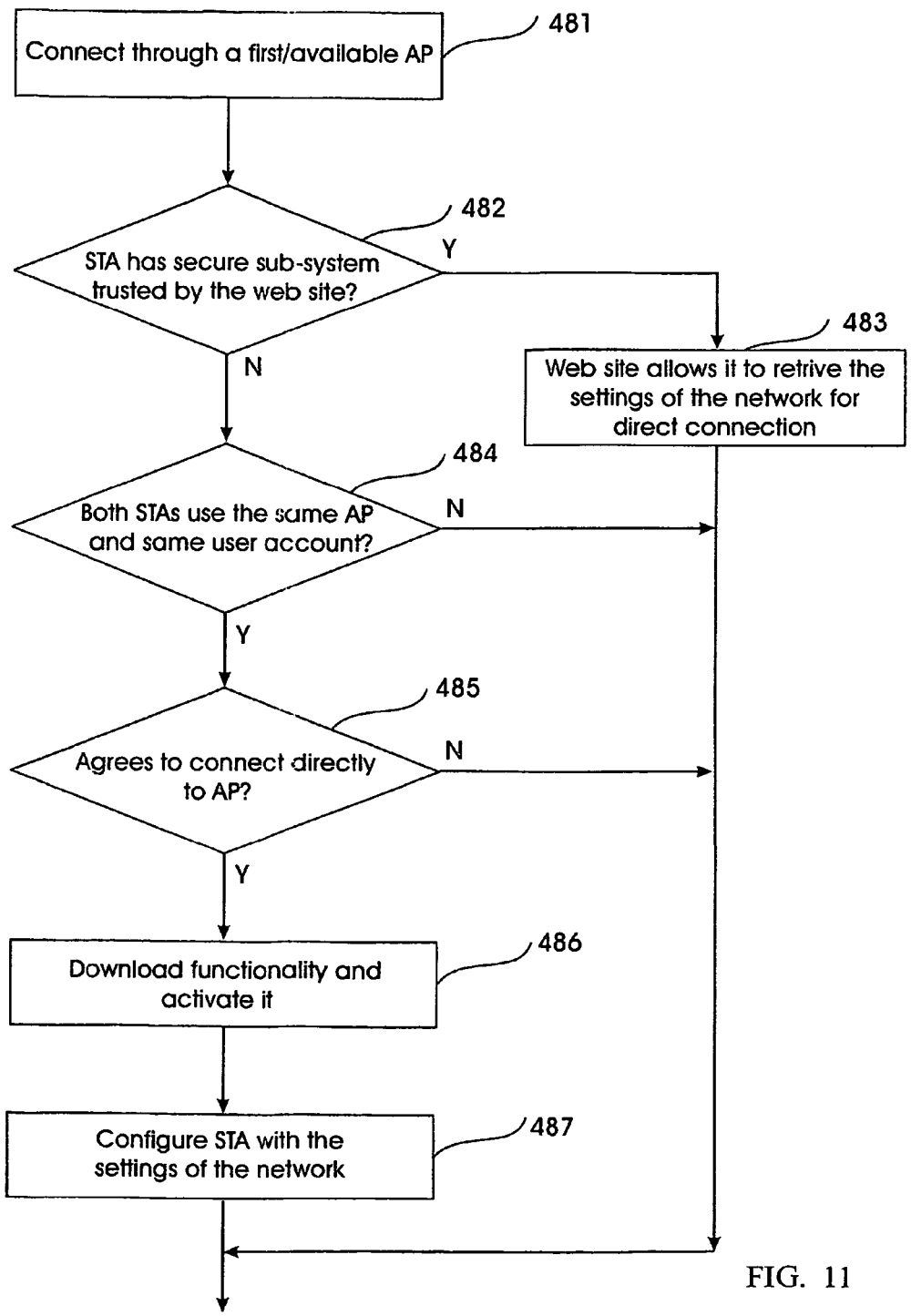

FIG. 11 details multi-AP and fast configuration setting aspects of the Vagabee spreading method for the second, to be connected STA, including:

a. Connect through a first/available AP 481 b. STA has secure sub-system trusted by the web site? 482 c. Web site allow it to retrieve the 483 settings of the network for direct connection d. Both STAs use the s'ame AP 484 and same user account?

e. Agrees to connect directly to AP? 485 f. Download functionality and activate it 486 g. Configure STA with the settings of the network 487

\*\*End of method\*\*

Many variations can follow to the above procedure, and should be clear to those skilled in the art. For example, the settings may be stored on laptop 11 instead on web site 30, the settings may be encrypted, and the sequence of events can be changed. The result is an easy configuration of the network by the user.

Figure 12:
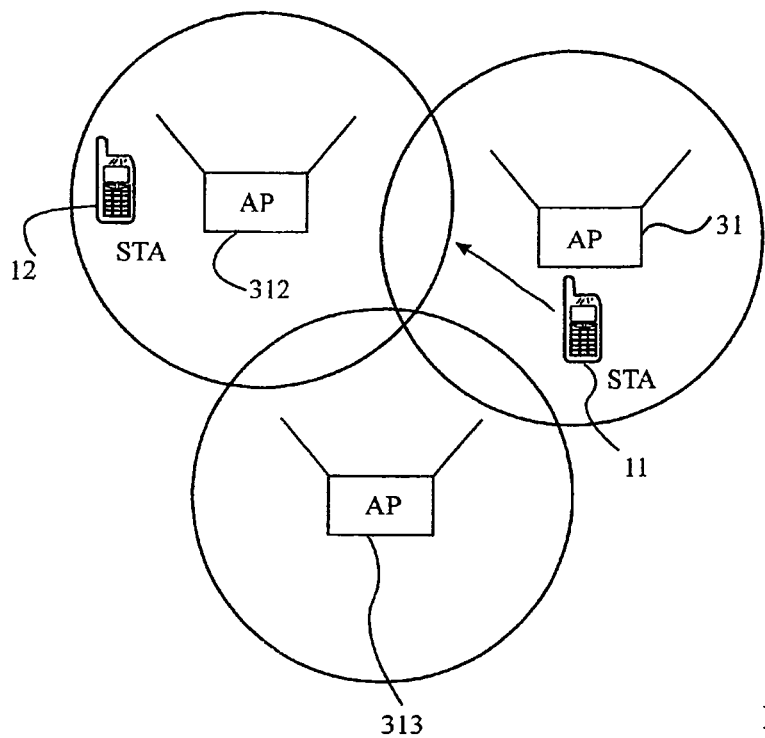
FIG. 12 illustrates a system including mobile stations (STAs) and their Access Points (APs), with one STA moving from the coverage of one AP to the coverage of another

FIG. 12 illustrates the mobile stations (STA) with their covering Access Points (AP), where STA 11 is moving from the coverage of AP 31 to the coverage of AP 312. STA 12 is already in the coverage of AP 312, and another AP 313 has a coverage that intersects with both the coverage of AP 31 and AP 312.

A Network Infrastructure for Other Devices

Functionality 31 may allow devices that do not have the functionality 31 to access the network. Such a device receives a capability to be identified as eligible to access the network towards functionality 31, and it identifies as eligible to access towards functionality 31 on the laptop in order to gain access to the network. Such identification may include cryptographic means, such as a digital certificate signed by an appropriate certification authority (CA) which gives the device the capability to be identified. Alternatively, the devices can be identified based on their MAC address. A username/password can be added for additional security.

Configuration of Secure Devices

It might be desirable to allow a device to directly connect to an AP, rather than connect through a laptop. When devices have a secure sub-system, i.e., a sub-system that is trusted by web site 30, web site 30 may allow it to retrieve the settings of the network (assuming that they are stored on web site 30), and configure the device to use the network.

As the device has a trusted sub-system, the settings can be stored in the sub-system, such that they do not leak outside.

Alternatively, functionality 31 can reconfigure the AP to allow access to a roaming device.

Displaying the Coverage Map

A problem often faced by users that wish to connect through wireless internet is that they cannot connect to the internet in their current location because the coverage in their area is locked, and they do not have access rights. A novel method and system helps users find the nearest location from which they can connect. Web site 30 holds a list of all access points from which users can successfully connect, together with all the list of APs from which are closed. The list includes the MAC address of each AP. Parts or all of this list can be downloaded in advance to a device, such as into laptop 11.

Then, laptop 11 uses the beacons of the APs which might be locked to determine its position (for example, www.SkyHookWireless.com uses beacons to determine the location of a STA). Then, laptop 11 can display on a map the location of the user, and the locations of near by access point in which it can connect to the internet. The user can then go to the nearby locations and connect to the Internet. The list in site 30 can be constantly updated by information that STAs receive.

In another embodiment, the list of APs in site 30 can also hold the probability that the AP is accessible. The probability can change if the access is provided by a laptop rather than an AP, and the laptop may be present or not. An area covered by several independent APs, each with low probability, results in an area with higher probability of accessibility in the intersection of these areas. The probability of accessibility can be depicted in the map shown to the user, for example, by different colors representing the different probabilities.

It is understood that the method and system in the present disclosure may be used for the transmission of voice, data, multimedia or a combination thereof.

Gathering Physical Location

To display a map of coverage, the real-world physical location of STAs needs to be known. A novel idea is to use STAs that are equipped with both GPS (Global Positioning System) and WiFi to report back to a server (for example, web server 20), a scanning result and the physical location in which the scan was performed. The server can extract the physical location of the fixed APs and store it in a database. At a later time, when a WiFi-equipped STA that lacks a GPS receiver performs a WiFi AP scan, it can report the results to the server, which can use the database to determine the physical location of the STA. This physical location can be used to provide location-based services.

Fast Handover

A novel aspect of very fast handover is to practically almost complete the process of the handover before it even started.

Figure 13:
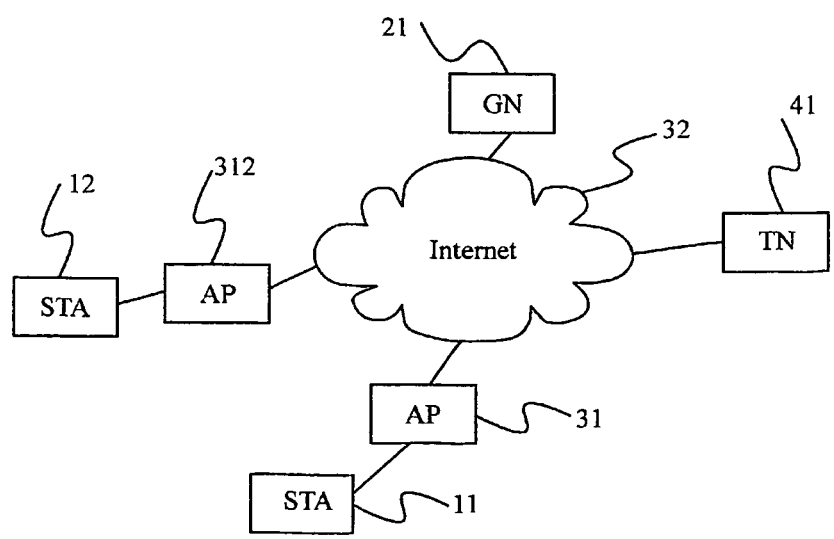
FIG. 13 illustrates a wireless system facilitating handover and including a STA, a Governing Node (GN) and another user, Termination Node (TN)

Consider an example depicted in FIGS. 12 and 13, in which STA 11 is in conversation with TN 41 (TN—Termination node, the node with which STA 11 communicates, shown in FIG. 13), and STA 11 is moving from AP 31 towards AP 32. Also assume that a node GN 21 (GN—Governing Node, a node that is non-exclusively responsible for the mobility management in a certain geographic area for a given time, shown in FIG. 13) is in contact with STA 11, and it is assisting STA 11 during the handover process. STA 11 currently has an IP address, which was allocated to it by AP 31.

To complete the handover, STA 11 should be associated with AP 32, have an IP address assigned by AP 32, complete any second authentication that is required, and have TN 41 be aware of the new IP address, so it can forward the conversation to the new location.

Note that in some scenarios (in some cases when there are firewalls or NAT devices between AP 32 and TN 41, the connection between STA 11 and TN 41 must be started from within AP 32 towards TN 41).

According to prior art, it appears that STA 11 cannot begin the handover process until it reaches the coverage of AP 32, since it cannot start the connection process. One novel solution (that requires changing the software of the AP) is to allow STA 11 to perform the connection process through the Internet, instead of performing it wirelessly. In this way, once STA 11 reaches radio connection with AP 32, it can start working immediately.

However, we are more interested in solutions where there is no need to change the AP. To achieve this goal, assume the existence of a non-moving STA 12 in the coverage of AP 32 (we will somewhat soften this assumption later). According to the present invention STA 12 is in contact with GN 21, and receives instructions to impersonate STA 11 towards AP 32 (we will later discuss how to make it possible), and complete a connection process with AP 32 on behalf of STA 11 (including authentication, association, receiving an IP address, performing any second authentication/log-in procedure, and perhaps even opening connections or "punching holes" in the firewall).

Then, STA 12 communicates these parameters to GN 21 (once the parameters are communicated, STA 12 can return to its real identity). GN 21 communicates the parameters to STA 11 (and perhaps to TN 41), and thus, STA 11 does no longer need to perform the connection process, and once it reaches the perimeter of the coverage (we will later discuss how to identify this situation) it can immediately use the new parameters and continue communications without any delay. STA 11 (or GN 21) can alert TN 41 before the handover, so it can start and send information packets to the new location.

TN 41 may send the information in parallel to the old and the new location, and cease transmitting to the old location once the handover is complete (e.g., when it receives information from STA 11 with its address from the new AP). STA 12 may even open a TCP (Transmission Control Protocol, as used in the Internet) connection or send a UDP (User Datagram Protocol) packet on behalf of STA 11, if required.

This connection may wait for STA 11 until it reaches AP 32. If there is a timeout on these connections (either due to protocol, or due to firewalls), STA 12 or other bypassing STAs can send and receive-keep-alive-messages on behalf of STA 11 (as is instructed by GN 20. The timeout for each AP can be discovered over time by trial and error (or by discovering the APs type), and storing this information in GN 21 for future use. GN 21 can notify the STAs on the value of the timeout.

How STA 12 can Impersonate STA 11:

To understand how STA 12 can impersonate STA 11 towards AP 32, we must understand how identity is established in the network. The basic identity in the network is the physical address which is known as MAC Address (Media Access Control Address), which is globally unique. Each manufacturer is allocated a portion of the address space and allocates a unique MAC address to every network card (including WiFi network card) that it manufactures. Then, the manufacturer burns the allocated address into the network card. However, in most network cards, an application can (temporarily) change the MAC address of the card to another MAC address.

The MAC address is not used for end-to-end communications over the internet, but usually only for communications within the same physical network. For example, STA 12 communicates with AP 32 using MAC address, but GN 21 is not usually aware of the MAC address of STA 12. The MAC address is universally unique. We use the feature of temporarily changing the MAC address in the network cards in a novel way, allowing STA 12 to impersonate STA 11.

Therefore, in the instructions that GN 21 gives to STA 12, it mentions the MAC address of STA 11, so STA 12 can assume the MAC identity of STA 11. Then, STA 12 can complete the association with AP 32 (using the MAC address of STA 11)), in which it receives the Association ID (AID), and completes a DHCP protocol in which it receives an IP address to be used with the MAC of STA 11 while it is using AP 32. STA 12 can also perform a second authentication and log-in on behalf of STA 11.

STA 12 sends the connection information back to GN 21, which forwards it to STA 11. STA 12 can return to its original MAC address, but the allocated resources at AP 32 remain allocated, as from the point of view of AP 32, STA 11 is already connected and in coverage. In order to avoid losing messages that are sent to STA 12 during its impersonation to STA 11, it can either continue and listen using both its own MAC address and STA 11's MAC address, or it can issue a—power-save—mode command to its serving AP. The power save mode indicates the AP that the STA is sleeping for a while, in which time the AP is buffering the incoming data packets. Therefore, even if STA 12 is connected to the internet using another AP, it can issue a power-save mode command, possibly change the frequency, and perform the connection on behalf of STA 12. It can return to its serving AP once the connection is established, or pool for incoming messages once in a while.

First Softening of the Assumption that STA 12 is in the coverage of AP 32: What if STA 12 is not in the coverage of AP 32, and there is no other station in AP 32's coverage—The following process can be performed in advance, well before a handover is needed. GN 21 can ask (in advance) stations that pass through AP 32 to connect and receive an IP address from AP 32 using some MAC address. The MAC address is not necessarily the MAC address of STA 11, as the process is not specific to STA 11. The stations send the connection details to GN 21, which stores the AID, the MAC, the IP address and other connections details in a pool for future use.

The pool may even contain UDP or TCP connections, which may be kept alive by bypassing STAs (against timeouts of firewalls, Network Address Translator devices (NAT), and protocol timeouts). UDP and TCP connections in the pool are targeted to some node in the network that can forward information for other nodes (for example TN 41). When a connection is required by some STA, the pool is queried, and a resource can be allocated and applied by a STA. As a result, a station might change its MAC address and IP address every time it moves between APs. If the station moves very fast between these access points, GN 21 can predict the direction in which the station is moving based on past movements, inform TN 41 of the possible future addresses.

Using this method, TN 41 can send data to the new address even before the station actually moved there. In some implementations of the APs and firewalls between AP 32 and TN 41 the STA must first send data before it can receive any data, otherwise, the firewall may block the incoming data, or a NAT (Network Address Translator) device might not know where to forward the data. The restriction, that the STA must be the first to send data, is usually required due to security policy that allows only outgoing connections, or due to NAT device that need to relate an internal IP address and port number with an external IP address and port number.

For example, in most NAT implementations a connection must be established from within the NATed zone (e.g., the AP coverage) towards the internet. Many firewalls also require that the connection is established from the private network towards the internet (rather than allowing incoming connections from the internet towards the private networks). In these cases, the data that TN 41 sends is not transmitted by AP 32 until the station reaches the access point and transmits information back to TN 41. Depending on the type of firewalls and NAT devices, TN 41 might be able to predict a port number to which it should send such messages before the first outgoing data packet is transmitted.

Another associated novel disclosure is that the same MAC address and IP address can actually be used by more than one STA. The differentiation between the STAs can be performed by using higher protocol identities such as different ports (for example TCP ports). Using the same MAC and IP address in more than one STA is not problematic for packets that are sent from the STA.

However, while receiving an incoming packet, only one STA should send an acknowledgement. As each STA knows the ports that are in use, it only acknowledges messages that are designated to, it. GN 21 can coordinate between the STAs such that they do not use the same ports. For example, if there are at most n stations using the same MAC and IP address, station i will allocate port numbers that are equal to i modulo n. Another solution is to choose the port number at random. If each STA uses one port at random, according to the birthday paradox, port collisions occur with very low probability as long as the number of connections is smaller than about the square root of 65536 (i.e., when there are less than 256 connections using the same IP).

Another idea is to change the software at the AP such that it can communicate with GN 21 and perform the connection procedure on behalf of STA 11.

Knowing Who are the Adjacent APs and the Location of a STA:

It is useful for a station STA 11 to know the identity of the adjacent APs that the station might hand over to. The identity of an AP can be established in several ways: The SSID (Service Set. ID) of the AP is usually broadcasted by the AP using periodical transmissions known as beacon. However, two adjacent AP may have the same SSID. In such a case, the MAC address of each AP is different, and APs can be differentiated based on their MAC address. Some APs do not transmit their SSID, but they still broadcast beacon messages with their MAC address. Even if the AP is locked and encrypted the MAC address is transmitted, and it is transmitted without any encryption. In this way, STA 11 can know the identity of adjacent APs, and infer its location.

Scanning by Idle STAs:

In a preferred embodiment, GN 21 collects information about APs which are adjacent. Idle stations (i.e. stations which are not in an intensive data transfer) can perform a scanning operation once in a while. As a result they learn the MAC address (and possibly the SSIDs) of the APs within radio reach. The STAs can then send this information to GN 21 which collects it. The idle STAs can also perform tests to check what is the accessibility parameters of an AP (e.g., is it an open and free AP, is it a locked AP and the password is available from GN 21, is it locked and there is no free access to the AP, is there a captive portal, does GN 21 have a user-name/password available for the captive portal, etc.). All this discovered information is sent to GN 21.

When handovers are performed, GN 21 takes note of the sequence of handovers that occur, and can learn common paths which are taken (for example, a road or a crosswalk might cause more likely paths than others).

It is very important that GN 21 knows in advance the AP to which STA 11 will be handed over to and when the handover will occur. Such a knowledge allows, for example, to alert TN 41 of the new location in advance. Gaining accuracy in the prediction of the handover (when and where) translates to better performance, as GN 21 needs to allocate a MAC address and an IP address to STA 11 in the new AP, and TN 41 might start to send data to the new location.

Therefore, knowing who the neighboring APs are, and their reception quality at STA 11 is very important.

Scanning by a Non-Idle STA

In principle, STA 11 can scan the surroundings once in a while and look for the beacons of adjacent APs, and thus measure the reception quality from each AP. However, such a scanning takes a lot of time (might even take couple of seconds for a full scan), Selective scanning for APs which are expected to be neighbors can reduce the scanning time, but it can still stay in the magnitude of a few hundred milliseconds. It is important to understand that during a contemporary scanning using current technology, STA 11 cannot receive or send messages from or to AP 31, which means that the scanning time must be reduced to reduce this disconnection time.

The novel disclosed method is that STA 11 will selectively scan for a neighboring AP in the following special way. Assume that STA 11 scans to see if it can receive the beacon of AP 33, where the scanning is performed exactly when the AP 33 is expected to transmit its beacon. Therefore, the disconnection from AP 31 will be minimal. The problem is, however, that although the beacons are transmitted periodically, STA 11 does not know when a beacon is expected to be transmitted from AP 33. As the beacons are transmitted about every 102.4 ms (milliseconds); (many variations are possible), STA 11 might be forced to wait on average 51.2 ms, which is a prohibitively long time to wait.

STA 11 may also transmit a Probe message to force a beacon to be sent especially for it—but a probe message requires a transmission that has implication on battery life. Furthermore, for the purpose of location finding, STA 11 might wish to be able to receive beacons of APs that will not answer the probe (due to range, policies, etc.)

We can safely assume that other STAs visited the area of AP 33 before STA 11, and that they have reported the rate of the beacons of AP 33 (e.g., a beacon every 102.4 ms). A problem that remains is that the beacons are scheduled according to the internal clock of AP 33, which might tick at a different rate than other clocks (and clocks tend to tick at different rates). Moreover, the clock of the visiting STAs is probably not exactly synchronized with the clock of STA 11, which makes the process inaccurate.

That is, even if STA 11 knows that at a specific time according to some STA's internal clock a beacon Was transmitted, STA 11 will not know how to translate this information to his clock, as the clocks are probably not synchronized to such great accuracy (network time synchronization services such as the network time protocol (NTP) cannot be more accurate than a couple of tens of milliseconds, where in this case we need an accuracy of around one millisecond). The following novel method allows accuracy of microseconds.

The novel approach for time synchronization is to rely on a relatively accurate clock already available to STA 11: The 802.11 standard requires each AP to transmit in its beacon its clock (referred to in the 802.11 standard as timestamp). This clock must be the internal clock of the AP at the time of transmission in units of microseconds. Therefore, STAs can specify the value of the clock of AP 33 in terms of the value of the clock at the adjacent AP 31.

By measuring the timestamp of AP 31 and AP 33 at two different times T311 and T312 (based on the clock of AP 31), in which the time value of AP 33 T331 and T332, respectively, it can be established with reasonable accuracy that AP 33 clock ticks approximately r33/31=(T32−T331)/(T312−T311) times for every clock tick of AP 31. At time T313 in the future, the clock of AP 33 can be estimated as T333=T332+(r33/31)(T313−T312). Similarly, at time T334 the clock of AP 31 can be estimated as T314=T312+(1/r33/31)(T334−T332).

Beacons are scheduled to transmission when the clock of the AP modulo the beacon interval is zero, where the beacon interval is measured in microseconds according to the clock of the AP, it is fixed for an AP, and the value of the beacon interval is transmitted in the beacon. Therefore, GN 21 stores the relation r3/31 together with T332 and T312 and the beacon interval of AP 33 and AP 31, and reports it to STA 11 such that it can extrapolate the time at AP 33 and infer the time of the beacon transmission.

Once STA 11 succeeds in receiving a beacon from AP 33 it can report the times to GN 21, so that GN 21 can keep its time tracking accurate. Furthermore, the scanning allows GN 21 and ST 11 to make the best handover decisions based on the knowledge of the approximate location of STA 11 with respect to the neighboring APs.

A technical problem to be solved is that a STA can know the value T311 but cannot measure the value of T331 at exactly the same time of T311 as these values are carried on the beacons of APs, which are transmitted at different times.

A solution is to measure the time of AP 33 T331' at a time close to T331, and note the time difference between the two measurements according to the STA's internal timer. As the measurements are very close to each other, the clock drift between the STA's timer and AP 33's timer is negligible, and we can estimate that T331=T331'+timediff, where timediff is the time difference between the measurements of T331 and T331' according to the timer of the STA. If there is a large clock drift after all (although it is not expected), it can corrected by calculating the r value between the clock at AP 33 and the STA in a similar way to the way done for. APs.

The location of STA 11 can be deduced from the reception quality, the reception strength and the identity of the neighboring APs. This location information can be taken into account while performing handover decisions, as well as for location based services or for other network applications.

It should also be noted that in Frequency Hopping, knowing the time of the AP has another special importance, as the frequency that the AP works in might depend on the time.

Figure 14:
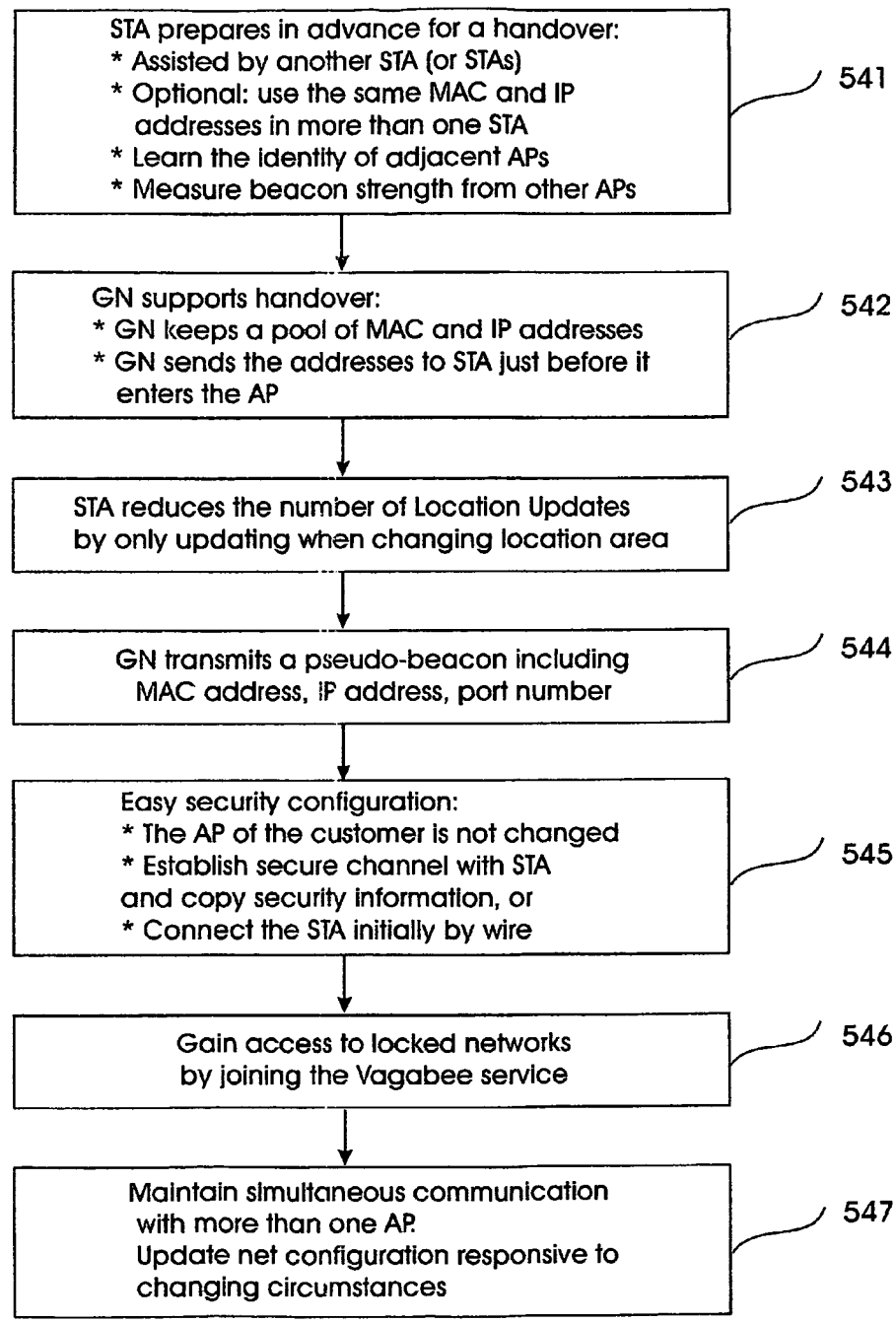
FIG. 14 details the handover method

FIG. 14 details a preferred embodiment of the handover method, including:
  a. STA prepares in advance for a handover: 541
  Assisted by another STA (or STAs)
  Optional: use the same MAC and IP addresses in more than one STA
  Learn the identity of adjacent APs
  Measure beacon strength from other APs
  b. GN supports handover: 542
  GN keeps a pool of MAC and IP addresses
  GN sends the addresses to STA just before it enters the AP
  c. STA reduces the number of Location Updates 543 by only updating when changing location area
  d. GN transmits a pseudo-beacon including 544 MAC address, IP address, port number
  e. Easy security configuration: 545
  The AP of the customer is not changed
  Establish secure channel with STA and Copy security information, or
  Connect the STA initially by wire
  f. Gain access to locked networks 546 by joining the Vagabee service
  g. Maintain simultaneous communication with 547 more than one AP.
  Update net configuration responsive to changing circumstances
  End of method.

Figure 15:
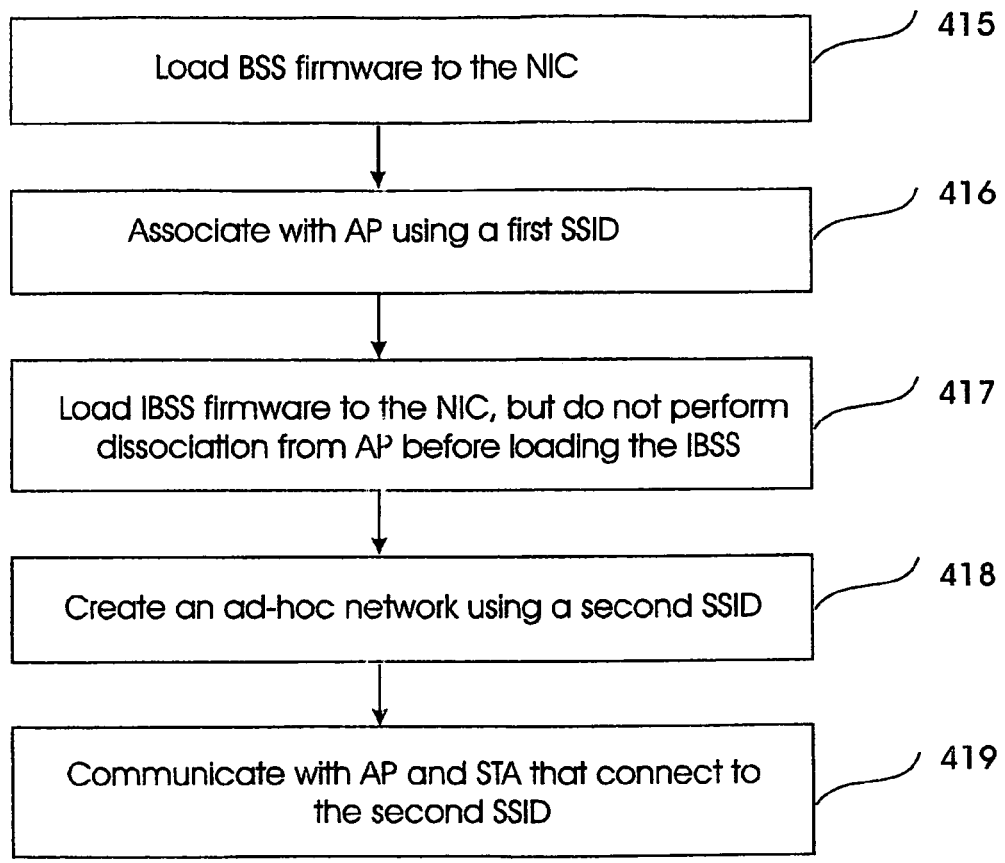
FIG. 15 details a method for implementing two connections with a STA.

FIG. 15 details a method for implementing two connections with a STA. The method includes:
  a. Load BSS firmware to the NIC 415
  b. Associate with AP using a first SSID 416
  c. Load IBSS firmware to the NIC, but do not perform 417 dissociation from AP before loading the IBSS
  d. Create an ad-hoc network using a second SSID 418
  e. Communicate with AP and STA that connect to 419 the second SSID
  End of method

Figure 16:
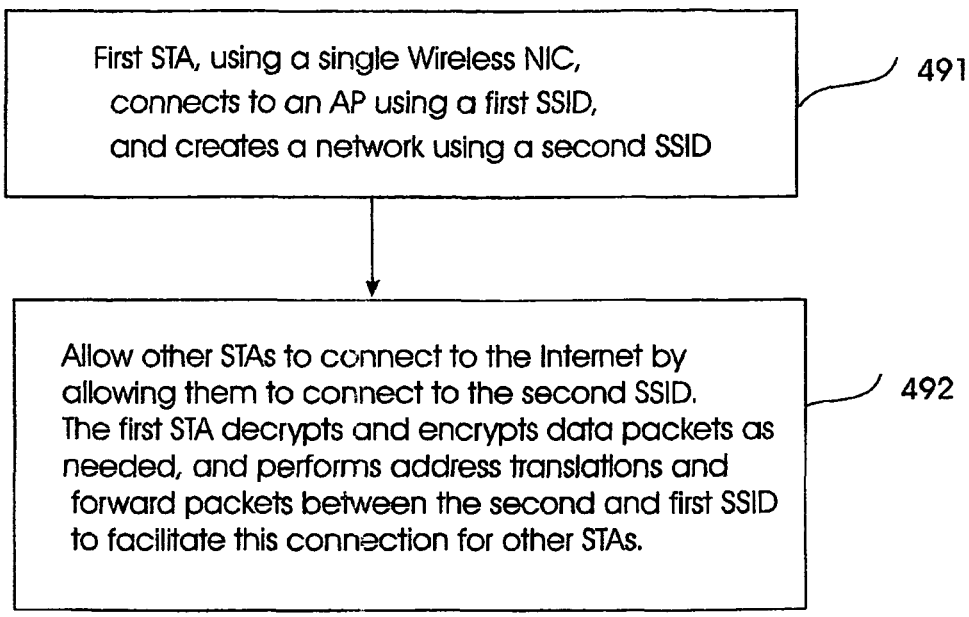
FIG. 16 details a method for connecting other STAs

FIG. 16 details a method for connecting other STAs, including:
  a. First STA, using a single Wireless NIC, 491 connects to an AP using a first SSID, and creates a network using a second SSID
  b. Allow other STAs to connect to the Internet by 492 allowing them to connect to the second SSID.
  The first STA decrypts and encrypts data packets as needed based on the security parameters of the first and second SSID (or APs), and performs address translations and forward packets between the second and first SSID to facilitate this connection for other STAs.
  End of method

Figure 17:
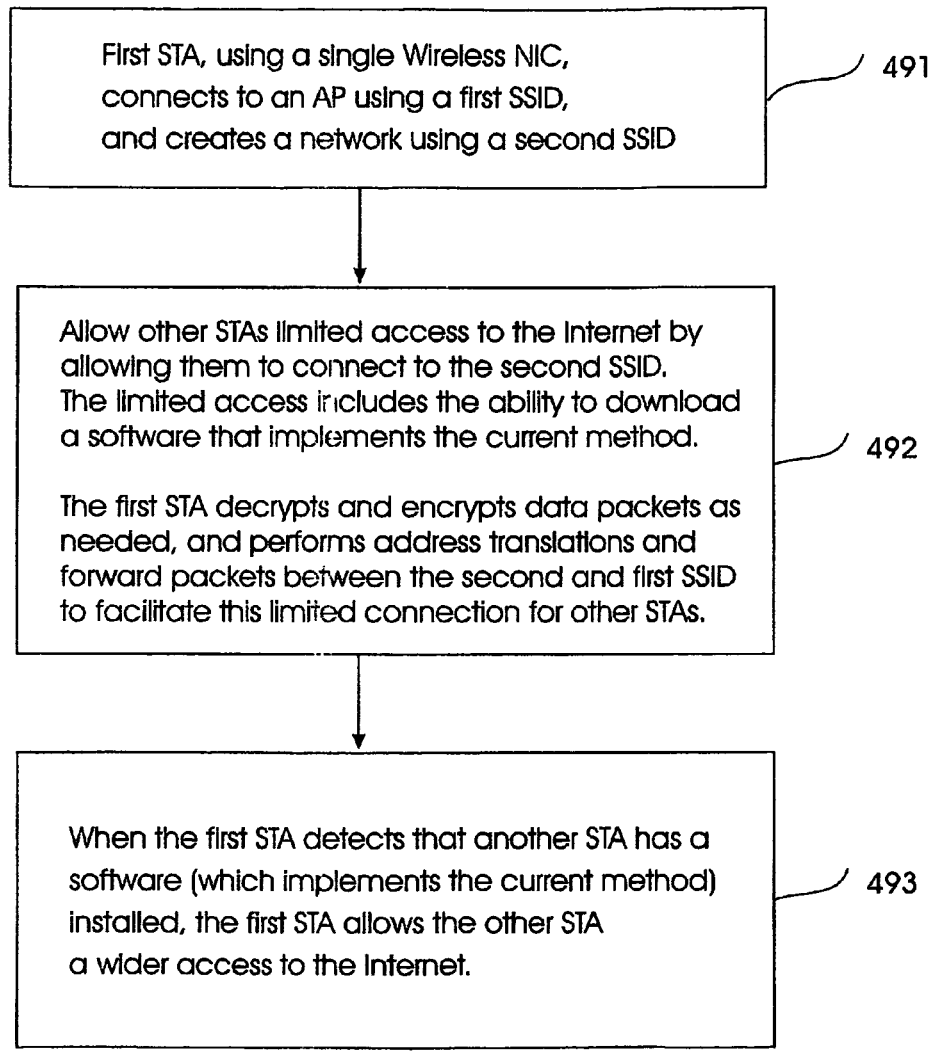
FIG. 17 details another method for connecting other STAs

FIG. 17 details another method for connecting other STAs, including:
  a. First STA, using a single Wireless NIC, 491 connects to an AP using a first SSID, and creates a network using a second SSID
  b. Allow other STAs limited access to the Internet by 492 allowing them to connect to the second SSID. The limited access includes the ability to download a software that implements the current method.
  The first STA decrypts; and encrypts data packets as needed based on the security parameters of the first and second SSID (or APs), and performs address translations and forward packets between the second and first SSID to facilitate this limited connection for other STAs.
  c. When the first STA detects that another STA 493 has a software (which implements the current method) installed, the first STA allows the other STA a wider access to the Internet.
  End of method

Figure 18:
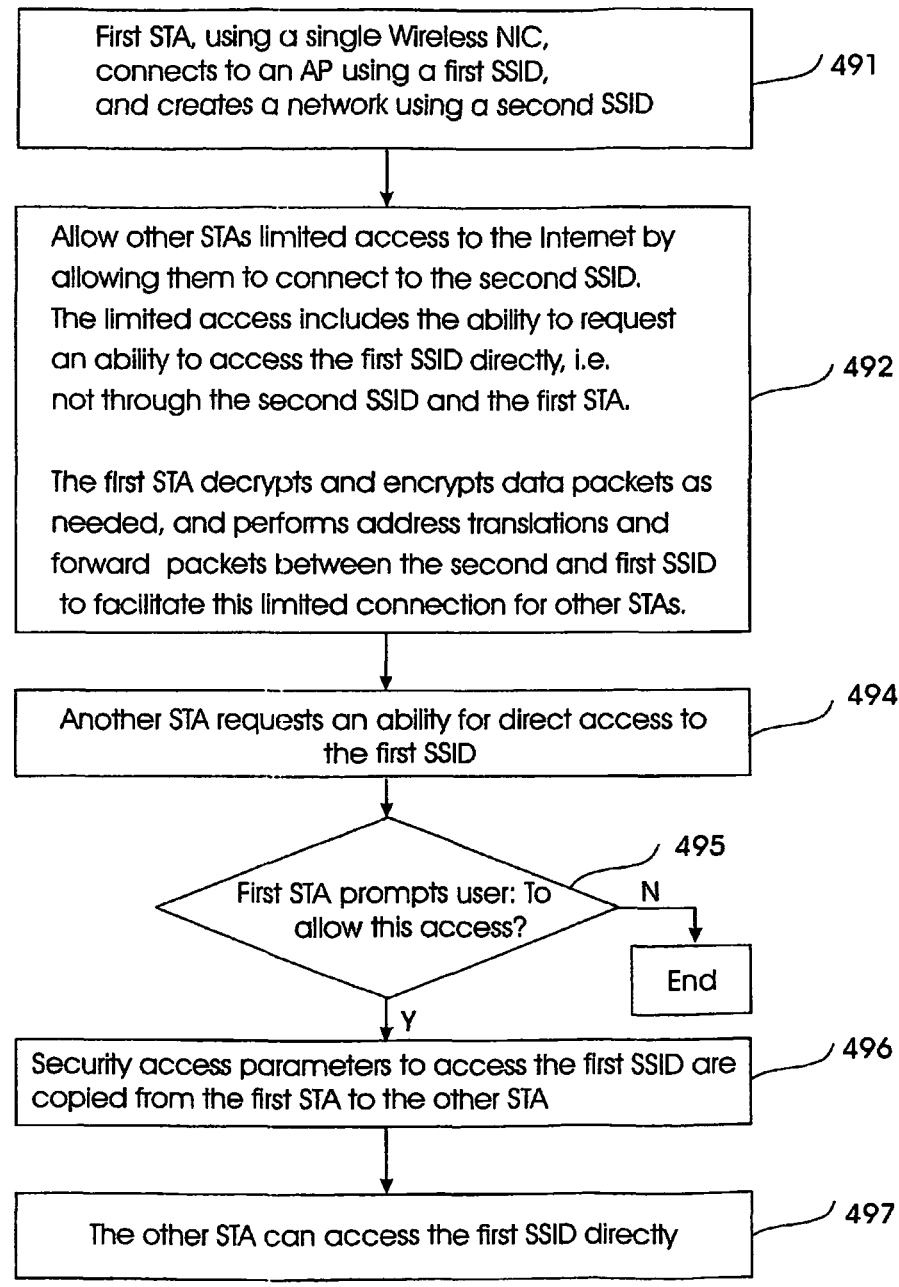
FIG. 18 details a method for configuring other STAs to directly connect to the AP FIG. 19 details another method for configuring other STAs to directly connect to the AP FIG. 20 details yet another method for configuring other STAs to directly connect to the AP

FIG. 18 details a method for configuring other STAs to directly connect to the AP, including:
  a. First STA, using a single Wireless NIC, 491 connects to an AP using a first SSID, and creates a network using a second SSID
  b. Allow other STAs limited access to the Internet by 492 allowing them to connect to the second SSID.
  The limited access includes the ability to request an ability to access the first SSID directly, i.e. not through the second SSID and the first STA.

c. The first STA decrypts and encrypts data packets as needed based on the security parameters of the first and second SSID (or APs), and performs address translations and forward packets between the second and first SSID to facilitate this limited connection for other STAs.

d. Another STA requests an ability for direct access to 494 the first SSID e. First STA prompts user: To 495 allow this access?

f. Security access parameters to access the first SSID are copied 496 from the first STA to the other STA g. The other STA can access the first SSID directly 497

End of method

Figure 19:
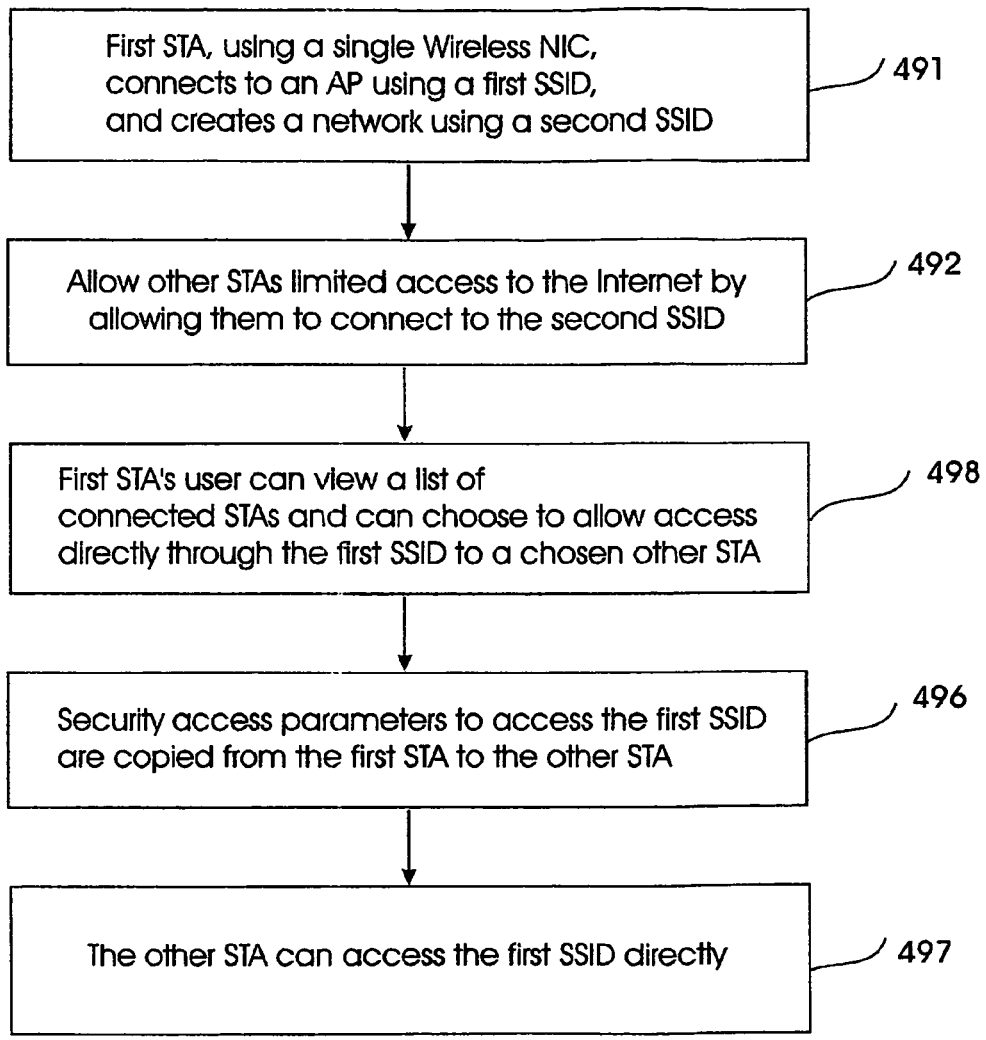

FIG. 19 details another method for configuring other STAs to directly connect to the AP, including:

a. First STA, using a single Wireless NIC, 491 connects to an AP using a first SSID, and creates a network using a second SSID b. Allow other STAs limited access to the Internet by 492 allowing them to connect to the second SSID.

c: First STA's user can view a list of 498 connected STAs and can choose to allow access directly through the first SSID to a chosen other STA d. Security access parameters to access the first SSID are copied 496 from the first STA to the other, STA e. The other STA can access the first SSID directly 497

End of method

Figure 20:
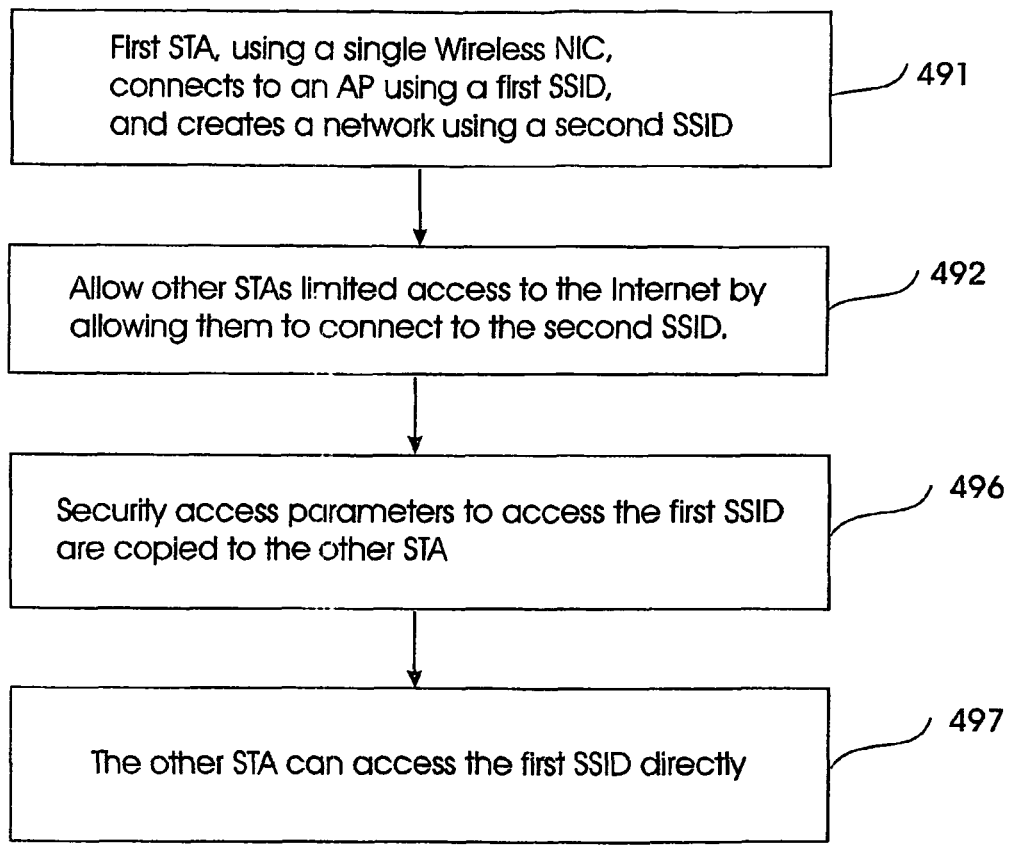

FIG. 20 details yet another method for configuring other STAs to directly connect to the AP, including:

a. First STA, using a single Wireless NIC, 491 connects to an AP using a first SSID, and creates a network using a second SSID b. Allow other STAs limited access to the Internet by 492 allowing them to connect to the second SSID.

c. Security access parameters to access the first SSID are copied 496 to the other STA d. The other STA can access the first SSID directly 497

End of method

Preventing Exhaustion of Resources at the AP

As discussed in the "Background" section, each AP has a limited number of Association IDs (AID) and usually, even a smaller pool of IP addresses (available through DHCP). Once this number of resources is exhausted, the AP might not be able to serve new STAs. A situation where IP addresses are exhausted can happen very quickly: for example, consider an AP in a very busy location, where there are many STAs that connect to the AP only for a short period of time. Each STA performs the connection process and obtains an IP address using DHCP, but as it disconnects it might not release the IP address.

The pool of IP addresses in an unmanaged AP is usually limited to about 200 addresses, with many consumer APs supporting only tens of addresses. A device is assigned the IP address for a given period of time (known as the lease time). Many times, the lease time is set in a magnitude of days (although the granularity is seconds), and in many other instances the lease time is set to a magnitude of hours. In such a situation the pool of IP addresses runs empty very fast.

However, in this disclosure for fast handovers, GN 21 keeps a pool of MAC addresses with associated IP address. Just before a STA enters the AP, GN 21 can send it a MAC address and an IR address that are already associated with the AP. Therefore, the STA can connect even if the AP has no resources left for new STAs. Combined with the above disclosure that allows several STAs to share the same MAC address and IP address, an AP can serve more APs than its IP resources, even above its limit on the number of associated STAs.

Saving Battery Power by Reducing Location Updates

A novel disclosure of this invention is a method to reduce the number of location updates that are needed in WiFi, when a STA is idle. A location update is the process in which a STA informs an entity in the network of the current location of the STA (the notification can take many forms, including opening a TCP connection, or sending UDP packets). In prior art for WiFi networks (with for example mobile IP, or SIP—Session Initiation Protocol), a location update is required whenever the IP address of the STA changes (for example, when moving between APs of different subnets)—even if the STA is idle.

The novel method allows defining a location area for WiFi, such that a STA needs to perform location update only when it moves between APs that belong to different location areas, but does not need to perform location update when it moves between APs of the same location area as long as ifs idle.

We assume that the APs are divided into location areas, and for each location area there is a node in the network that is in charge of this location area. For example, assume GN 21 is in charge of a location area composed of AP 31, AP 32, and AP 33.

How does a STA know which AP belongs to the location area—Either GN 21 gives it a list of all the APs that belong to the location area, or GN 21 transmits a pseudo-beacon in each AP.

A pseudo-beacon is a novel disclosure of this invention. It is a message that GN 21 can periodically transmit in each AP. While some APs might permit a remote node to transmit a message in the AP, other APs might not allow it. In the novel method, a certain MAC address, IP address, and possibly port are allocated in each AP for the purpose of pseudo-beacon transmission. GN 21 asks some STA to open a connection using these resources to GN 21, and GN 21 sends the pseudo-beacon messages using this transmission. Each pseudo-beacon contains the parameters needed to listen to the pseudo-beacons in the adjacent APs. A STA that lacks these parameters can contact GN 21 and receive them.

From that moment on, the STA can move between APs in the same location area, and receive the parameters that are needed to listen to the pseudo-beacon from other pseudo beacons. For example, assume that STA 11 is located in AP 31 and is moving to AP 32. STA 11 listens to the pseudo-beacon at AP 31, and from the pseudo-beacon learns the parameters that are needed to listen to the pseudo-beacon of AP 32. Thus, STA 11 can move to AP 32 without any transmission.

Which STAs of the stations in AP 31 should acknowledge the pseudo-beacon—Preferably, none. However, some firewalls require minimum rate of outgoing packets to maintain an open connection. In such a case, once in a while GN 21 sends on the pseudo-beacon a message that asks any station to send an acknowledgement with some probability p. The probability that GN 21 states should be accommodated to the expected number of stations in AP 31 (GN 21 might not exactly know how many STAs are in the AP). If no STA acknowledges the pseudo-beacon for over the needed time, and the timeout of firewalls stop the incoming messages, then no pseudo-beacons are transmitted. In this case, a roaming STA will contact GN 21 after a certain period of time of probing for the pseudo-beacon has passed (and no pseudo-beacon is seen). GN 21 can request the STA to reopen the connection for the pseudo-beacon transmission.

If the STA is in a session with TN 41 with many packets received (e.g., above a certain threshold), it is considered non-idle (which we also refer to as "In conversation") and is treated as described above in "Fast handover".

However, assume that STA 11 is in idle mode (e.g., incoming packets below a threshold), it can move between APs of the same location area without performing location update. When a node TN 41 wishes to send data to STA 11, STA 11 should change its state from idle to in conversation. TN 41 contacts GN 21 (TN 41 might be forwarded to GN 21 through a system such as dynamic DNS (Directory Name Service) or another method, such as a Distributed Hash Table—DHT, or a peer-to-peer network).

GN 21 sends a paging message for STA 11 on the pseudo-beacon of all the APs in the location area. As STA 11 listens to one of the pseudo-beacons, STA 11 will receive the paging message. Then, STA 11 responds preferably to GN 21 (or to TN 41, depending on what is written in the paging message) by initiating an outgoing connection as described below. It should be noted that GN 21 can first page for STA 11 in the APs that have a higher chance covering STA 11, and the paging can repeat several times until STA 11 replies.

When a STA is required to initiate an outgoing connection it can use a resource (MAC, IP, or TCP/UDP with port, user/password) that is listed as available on the pseudo-beacon or on the paging message, or it can request its own resources from the AP. If two (or more) STAs use the same resources for a connection at the same time, GN 21 will detect it, and in the acknowledge message (or second message of the TCP handshake) will announce the identity of the STA that it answers to. The other STA is required to initiate an outgoing connection again. Once a connection with GN 21 is established, GN 21 can allocate resources to the STA such that it moves to be in conversation status. One of the resources that are allocated is GN 21 attention to accompany the STA as it might need to perform handover to another AP.

It should be noted that the location areas can overlap, meaning a single AP can belong to more than one location area. Upon the policy of the network, STA 11 might be required to perform location update when it reaches such a APs, or it may just give helpful information. If possible, a STA might prefer to park on an AP that is within the same location area as its current AP, such that a location update is avoided.

It should also be noted that there is a tradeoff between the overhead that is spent during paging and establishing the connection, and the overhead that is being spent to keep a steady connection for each AP. The optimal point on the tradeoff depends on the rate that the AP switches APs as well as on the number of packets it receives and sends.

Easy Configuration of STA

When purchasing a new STA, it is required to configure the STA with the security settings of the existing network (in case the network is secure). If the network is not secure, the new owner usually only needs to select his network from the list of available networks that is received by the wireless network card.

Configuring the security might be a tedious job, as the security (authentication/encryption) code might be very long as known in the art, which the user might need to punch in. A novel solution for easy configuration is disclosed. Unlike previous solutions, the novel method does not require changing the existing AP of the customer. In one embodiment, software is run on a personal computer of the user (that is already configured to access the WiFi). Then, the software establishes a secure channel with the STA, and copies the security information from the personal computer to the STA. In this way, the STA learns the security parameters.

In another embodiment, the customer first connects the STA by wire to its network (or alternatively, the STA first connects using a connection it establishes through an already connected device, such as a personal computer). As the STA can receive and transmit signals or the wireless network and it is connected to the interne (through the other connection) at the same time, it tries to locate the web configuration of the AP on the wired network (most APs have a web interface). In most cases, it is an easy job for the STA, as either the STA can locate the AP as it is the default gateway of the wired network, or it can try to find its IP by performing RARP (Reverse Address Resolution Protocol) using the wireless MAC address of the AP (which it can see off-the-air).

If none succeeds the STA can perform exhaustive search on commonly used IP addresses, or on very probable addresses, like all the IP addresses of the same subnet. Once the AP web interlace is found, the STA tries to log into the AP. It can guess the default address or find it on a database that can be built on the web, with common default passwords for each manufacturer (the manufacturer and model will be usually sent by the AP during the web login process, or can be found out using the MAC address, which is unique per manufacturer). If the password for the AP cannot be guessed, the user is prompted for its password to complete the log-in. Then, the STA navigates to the security settings page and retrieves the password needed for the wireless network.

In the event that the procedure fails, the user is prompted for the security settings (which would happen without using the above method). For most common users and setups, the method succeeds (and for unsophisticated customers, who do not change the passwords—it succeeds in the majority of the cases). Thus, in the majority of cases, the setup is made much simpler.

Once the STA has access to the setup of the AP, it can (with permission from the user), open holes or forward certain port to some IP address. This IP address and port can serve as way that GN 21 can send and broadcast the pseudo-beacon, without a STA first opening a connection from the AP, and without worrying about timeouts (provided that there are no other firewall between the AP and GN 21). Opened ports can also help during the fast handover, such that TN 41 can directly send packets to the new location without a need for STA 12 to open the connection.

In corporate settings, the company can set a special server which gives the configuration to the phone, over the network.

Gaining Access to Locked Networks

While performing the above easy setup (or at any other time), the user is prompted if he wishes to join a swapping service. The swapping service allows the user to gain access to many locked networks (the locked networks of the other users that joined the swapping service), in return that he allows users to use his network for the purpose of connecting to the Internet. If the user agrees, the access parameters to his network (encryption key, MAC address, default gateway, etc.) are securely stored in the network (for example in GN 21, and a backup server). The security information is securely sent directly into the hardware (or network card) of other STAs, when they need to connect using his AP.

As the security parameters are sent directly to the STA's network hardware, it can make sure that the communication that is established is designated outside the user's network, and will not jeopardize the computers on the user's network. Furthermore, GN 21 can monitor the amount of bandwidth that is consumed by visiting users, and to make sure their hardware limits the amount of used bandwidth such that the user does not experience a degradation of quality of his connection. Alternatively; the security information can be sent to the other STAs using other security measures, as known in the art.

In many scenarios it is enough to trust the software that runs on the STA to make sure all communications are targeted outside the user's network, such that it does not jeopardize the computers on the user's network, and limit bandwidth used by the STA.

The secrecy of the security parameters (such as the encryption key) can be cryptographically protected while on transit and storage, as known in the art.

Some APs limit the access of the subscribers by making sure that only specific MAC addresses connect to the network. As our methods as described above allow to use the same MAC address for several users, this specific MAC address can be used when using the network that restricts the use with specific MAC address.

In case a STA tries to connect to an AP with a captive portal, a special application on the STA is running and performs the authentication and log-in automatically. GN 21 can store typical portal appearances, such that it can guide the STA on how to perform the authentication/log-in process. If the STA comes across a captive portal which is unknown or unexpected, it can locally store the web pages that if received from the captive portal and later transfer them to GN 21. GN 21 accumulates the reports and guides STAs how to log-in to the captive portal in the future. As part of the swapping service, GN 21 can store username/passwords to enable connection through the captive portal automatically.

Special Care for Data

The above description: works well for both voice and data. TN 41 might be a mobile node as well, or a fixed node in the network. The transferred information between STA 11 and GN 21 can be voice, data, or their combination.

In case STA 11 wishes to communicate with a node that is not aware of the novel network, it can do so through a node that is aware of the network. For example, TN 41 can serve as a proxy for STA 11 (in a similar way to mobile IP). The node that is not aware of the network communicates with TN 41. TN 41 forwards the information to STA 11. TN 41 can allocate an IP address (perhaps using NAT, or allocate ports using its own IP address) that will serve STA 11.

To balance the communication load, STA 11 can have several network nodes such as TN 41, TN 42 (not shown), etc, to be its proxies in parallel. In fact, the resulting connection between STA 11 and TN 41 can be seen as a layer 2 (MAC) connection, on top of which the communication is performed. In this setup, TN 41 serves as the default gateway of STA 11, and optionally can run a DHCP server and a NAT server.

Executing the Invention Over a Peer-to-Peer Network

Another novel aspect of the above novel methods takes advantage of the fact that the wireless network is local in nature, as the APs are geographically adjacent. The system and method as described in this disclosure allows GN 21 to be responsible over a small geographical area with little interaction with its neighbors. As a result, the methods that are disclosed can be implemented by many small devices forming a peer-to-peer network that implements the methods, without the need to rely heavily on large servers.

Many nodes GN 21, GN 22 (not shown), can each control a group of APs. To make the system grow "automatically", it is possible to give users a "base" that will act as their point of presence in the network. For example, the base can assume the role of TN 41 as a Mobile IP proxy. The base can connect to the wired network at the premises of the customer. Some bases will assume the role of a GN, where the GNs can be managed by either a network control center, or through peer-to-peer protocols.

In early stages of deployment of the system, when there is still a small number of GNs, each GN might need to cover a large number APs. A general server can back-up all information that the GNs hold. To avoid the situation, where a single GN needs to cover a huge number of APs with pseudo-beacons, the system might not use the pseudo-beacon mechanism (although, it should be noted that with moderate computing power and network resources, a GN might be able to cover a few thousands of APs). In the worst case scenario of a peer-to-peer network, there is one base (GN) for each STA, and this GN act as the GN for the APs in the proximity of the STA.

When the STA moves, the coverage area in the responsibility of the GN moves with it. In this case, the ON can fetch information on neighboring APs from the general server. When GN abandons an AP, it can store the information it gathered about it in the general server, for later use by possibly other GNs. In a system which is not based on many small GNs, a large GN can assume the role of the smaller GNs.

It should be noted that it takes some time to gather the information on the APs (such as timing, default gateways, etc). However, once a single STA passes in an area, it obtains the needed information. This information is later stored in the GNs and general server, for the benefit of all STAs in the future.

If a STA needs to handover into an AP which has no STAs currently in it, it might not have the needed resources pre-allocated (such as an associated MAC address and IP address), and might therefore need to gain it by itself. However, in many cases the STA can obtain resources at one pass in the area, and these resources (such as IP address) will stay for the next pass in the area (which can be hours later).

An Alternate Fast Method for Connecting to an AP—Removing the Assumption on the Existence of STA 12 in the Coverage of the New AP A possible drawback of the above method of fast handover is that it requires that the pool of resources that GN 21 holds should contain a valid IP address of the AP that STA is handing over to. If the DHCP lease time is long enough, having a valid IP might not be a problem, but on short lease times with only a few STAs roaming it is desirable to perform handovers even if there is no valid IP available in the pool. Unfortunately, a typical execution of the DHCP protocol can take several seconds to complete, which might be too long for a fast handover. Interestingly, we observe that many APs will forward information even if the IP that is being used was not allocated by DHCP.

Therefore, we disclose the following method:

Choose a MAC and associate it with the AP (or use an Associated MAC without an associated IP address), choose a random (but valid) IP address, and use it.

The STA must use the correct default gateway settings of the AP (these settings can be stored in GN 21). If the STA wishes to use DNS, it must have the DNS settings of the AP (which can be received from GN 21), or DNS services are provided through GN 21.

Choosing a valid IP at random results in a very low probability of colliding with another IP address that is used in the AP. Note, however, that the STA still needs to authenticate/log-in through the captive portal in case such portal exists.

Another method that can be used to quickly obtain an IP address, such that the IP address is not already allocated by the DHCP of the AP is disclosed. Most DHCP implementations of AP send an ICMP (Internet Control Message Protocol) Echo Request (ping) before allocating an IP address, to make sure that it is unused. Therefore, STA can begin the DHCP protocol, then, wait for the ICMP echo request that the AP sends, and understand the IP that is going to be allocated to it.

Therefore, a STA can start using the IP address and respond to the ICMP echo request. It can then prematurely terminate the DHCP protocol (as it already got an IP). Alternatively, STA can use the IP address from the ICMP echo request without responding to it, and complete the DHCP process. If the IP address that is allocated during the DHCP is identical to the IP address (vast majority of cases), then STA simply saved time. Otherwise, it can move from the IP address of the ICMP echo request to the IP address that was allocated.

If no connection to GN 21 is available, the default gateway address can be guessed, as in the majority of the cases the default gateway address is one out of only a few addresses. Common addresses are: 192.168.1.1, 192.168.2.1, 10.0.0.1, etc.

Moreover, the default gateway is usually the AP itself. Its MAC address is known (as it is broadcasted in the beacon). Therefore, in most cases it is enough to forward packets to this MAC address (without knowing its IP address).

A STA with a Capability to Connect on Two Channels in Parallel

The present application discloses a STA which has a capability of communicating in two or more channels in parallel (for example, by using two wireless network cards). This capability can enable a STA to be connected to two APs in parallel without the need to implement sophisticated mechanisms that actually simulate this situation. Thus, a STA can connect with future AP while maintaining a connection through its serving APs. Being connected to two or more APs simultaneously allows greater bandwidth by utilizing two connections instead of one, and the performance of soft-handovers, i.e., the STA stays connected through one AP, while disconnecting from the second AP in the process of handover.

Fast Uploading of Digital Camera Pictures

Digital cameras might be equipped with WiFi. The owner of such a camera would like to upload his pictures from the camera to a server that stores the pictures on the Internet—the reasons for this may vary from being able to share the photos while on vacation with family members left at home, back up the pictures from the digital camera to the Internet server, or simply because the memory card on the camera is running out of space. A major problem is that to upload the pictures to the Internet may take a very long time, as pictures consume megabytes to store.

Solution: The camera sends the photos to a laptop over WiFi (this connection is very fast), then disconnects and the camera's user may move on. Then, the laptop uploads the pictures to the Internet server (this process can take a long time as it involves uploading a lot of data), but the laptop owner would not feel it as a burden, since the pictures can be uploaded when his Internet connection is not used for other purposes.

Method for Uploading Data Files

In a system with means for providing a wireless Internet connection to WiFi-enabled devices (STAs), a method for fast uploading of information from STAs to the Internet, comprises:

a. a first STA, such as a laptop computer, connects to the Internet;

b. a second STA, such as a camera, wirelessly connects to the first STA, and uploads the information using the fast and direct-wireless connection between the STAs;

c. The first STA temporarily stores the information;

d. The first STA uploads the information to the Internet through its backhaul.

\*\*End of method\*\*

Notes:

1. In the above method, the first STA may include for example a laptop or a personal computer, the second STA may include a digital camera or a digital video camera, and the information may include digital pictures or digital clips.

2. The second STA preferably disconnects from the first STA after completing to upload the information to the first STA, but before the first STA completes the upload of information to the Internet; the first STA completes the upload of information from its temporary storage.

3. An additional step in the above method may include the following:

e. at a later time, the second STA connects to the Internet and verifies that the information was uploaded correctly.

4. The information may be encrypted by the second STA before being transmitted.

It will be recognized that the foregoing is but one example of an apparatus and method within the scope of the present invention and that various modifications will occur to those skilled in the art upon reading the disclosure set forth hereinbefore.

I claim:

1. A computing device comprising:
at least one communication module adapted to:
   (1) wirelessly connect said computing device to an IP based network via a first wireless access point (AP) having a first AP Identification (APID); and
   (2) wirelessly communicate with other wireless enabled computing devices;
a user interface and display adapted to allow a user of said computing device to interact with destinations over the IP based network, through the first wireless AP, using a first public IP address associated with the computing device; and
an AP module adapted to:
   (1) provide a given device of the other wireless enabled computing devices with access to the IP based network by causing said computing device to serve the given device as a second AP having a second APID, distinct from the first APID, and provide the given device access to the network via the first AP; and
   (2) tunnel data traffic from the given device, through said computing device, through the first AP, through the IP network, to a proxy server, such that the proxy server acts as a proxy of the given device and the data traffic is secure from said computing device and first AP and the given device operates on the network using a second public IP address distinct from the first public IP address, with the second public IP address associated with the given device.

2. The computing device of claim 1 wherein the second APID is associated with the proxy server.

3. The computing device of claim 1 wherein the AP module is adapted to tunnel data traffic from the given device through said computing device, through the first AP, through the IP network, to a proxy server in response to at least activating data service for the given device through a captive portal web interface.

4. The computing device of claim 1 wherein the first wireless AP is included in a cellular telephone network.

5. The computing device of claim 4 wherein the first wireless AP is a cellular cell.

6. The computing device of claim 1 wherein the AP module is controlled by a network entity in a cellular system.

7. The computing device of claim 1 wherein the first wireless AP and the second wireless AP use different wireless communication protocols.

8. The computing device of claim 1 wherein the first wireless AP is included in a terrestrial wireless network.

9. The computing device of claim 1 wherein the proxy server acts as a proxy of the given device for the given device to interact with destinations over the IP based network.

10. The computing device of claim 1 wherein the AP module is adapted to prevent data packets destined for the user interface and display from being accessed by the given device.

11. The computing device of claim 1 wherein the AP module is adapted to disconnect the given device after a predetermined period.

12. The computing device of claim 1 wherein the second public IP address is shared by the given device with at least one other device of the other wireless enabled computing devices.

13. The computing device of claim 12 wherein data packets destined for each of the given device and the at least one other device are differentiated using different port numbers.

14. The computing device of claim 1 wherein the AP module is adapted to prevent the given device from accessing internal IP addresses associated with the computing device.

15. The computing device of claim 1 wherein the AP module is adapted to restrict the given device from accessing a predetermined set of IP addresses.

16. A system comprising:
a first wireless access point (AP) connected to an IP based network, the first wireless AP having a first AP Identification (APID);
a proxy server connected to the IP based network and adapted to act as a proxy of at least a subset of computing devices that connect via the first wireless AP; and
a first computing device having a user interface, wherein the first computing device is adapted to:
wirelessly connect to the IP based network via the first wireless AP;
wirelessly communicate with other wireless enabled computing devices;
enable a user of the first computing device to interact, through the user interface, with destinations over the IP based network, through the first wireless AP, using a first public IP address associated with the first computing device;
provide a second computing device of the other wireless enabled computing devices with access to the IP based network by causing the first computing device to serve the second computing device as a second AP having a second APID, distinct from the first APID, and provide the second computing device access to the IP based network via the first AP; and
tunnel data traffic from the second computing device, through the first computing device, through the first AP, through the IP network, to the proxy server, wherein the proxy server acts as a proxy of the second computing device and the data traffic is secure from the first computing device and the first AP and the second computing device operates on the IP based network using a second public IP address distinct from the first public IP address, with the second public IP address associated with the second computing device.

17. The system of claim 16 wherein the first computing device is further adapted to:
provide a third computing device of the other wireless enabled computing devices with access to the IP based network by causing the first computing device to serve the third computing device as the second AP having the second APID, distinct from the first APID, and provide the third computing device access to the IP based network via the first AP; and
tunnel data traffic from the third computing device, through the first computing device, through the first AP, through the IP network, to the proxy server, wherein the proxy server acts as a proxy of the third computing device and the data traffic is secure from the first computing device and the first AP and the third computing device operates on the IP based network using a third public IP address distinct from the first public IP address, with the third public IP address associated with the third computing device.

18. The system of claim 16 wherein the second APID is associated with the proxy server.

19. The system of claim 16 wherein the proxy server acts as a proxy of the second computing device for the second computing device to interact with destinations over the IP based network.

20. The system of claim 16 wherein the second computing device connects to the IP based network through a third AP having a third APID, distinct from the first APID and the second APID, concurrently with connecting to the IP based network through the second AP.

21. The system of claim 16 wherein the first computing device is adapted to prevent data packets destined for the user interface from being accessed by the second computing device.

22. The system of claim 16 wherein the first computing device is adapted to disconnect the second computing device from the second AP after a predetermined period.

23. The system of claim 16 wherein the proxy server allocates the second public IP address for the second computing device and forwards data packets destined for the second public IP address to a current IP address associated with the second computing device, wherein the current IP address is distinct from the first public IP address and the second public IP address.

24. The system of claim 23 wherein the proxy server replaces the current IP address with the second public IP address in data packets destined for other servers on the IP based network, wherein the data packets are tunneled from the second computing device, through the first computing device, through the first AP, through the IP network, to the proxy server.

25. The system of claim 23 wherein the proxy server updates the current IP address associated with the second computing device in response to the second computing device connecting through a different AP.

26. The system of claim 16 wherein the first computing device is adapted to tunnel data traffic from the second computing device through the first computing device, through the first AP, through the IP network, to a proxy server in response to at least activating data service for the second computing device through a captive portal web interface.

27. The system of claim 16 wherein the first wireless AP is included in a cellular telephone network.

28. The system of claim 27 wherein the first wireless AP is a cellular cell.

29. The system of claim 16 wherein the second AP is controlled, at least in part, by a network entity in a cellular system.

30. The system of claim 16 wherein the first wireless AP and the second wireless AP use different wireless communication protocols.

31. The system of claim 16 wherein the first wireless AP is included in a terrestrial wireless network.

32. The system of claim 16 wherein the second computing device is further adapted to provide a third wireless enabled computing device with access to destinations on the IP based network by causing the second computing device to serve the third device as a third AP having a third APID, distinct from the first APID and from the second APID, and provide the third device access to the IP based network via the second AP using the connection between the first computing device and the IP based network through the first AP.

33. The system of claim 32 wherein the second computing device restricts destinations on the IP based network accessible by the third device.

34. The system of claim 16 wherein the tunneled data traffic includes data packets for use in conducting a IP based phone call.

35. The system of claim 16 wherein the tunneled data traffic includes data packets representing data to be uploaded to a remote server from the second computing device.

36. The system of claim 16 wherein data packets received by the second computing device from a destination through the proxy server, through the IP network, through the first AP, through the first computing device, through the second AP include at least one of a picture, video, or audio.

37. The system of claim 16 wherein the second public IP address is shared by the second computing device with at least one other device of the other wireless enabled computing devices.

38. The system of claim 37 wherein data packets destined for each of the second computing device and the at least one other device are differentiated using different port numbers.

39. The system of claim 16 wherein the first computing device is adapted to prevent the second computing device from accessing internal IP addresses associated with the first computing device.

40. The system of claim 16 wherein the first computing device is adapted to restrict the second computing device from accessing a predetermined set of IP addresses.

41. The system of claim 16 wherein the proxy server provides a dynamic host configuration protocol (DHCP) service that assigns an IP address for the second computing device.

42. The system of claim 16 wherein the proxy server provides a network address translation (NAT) service that translates IP addresses for the second computing device.

43. A method comprising:
wirelessly connecting a first computing device to an IP based network via a first wireless access point (AP) having a first AP Identification (APID), wherein the first computing device wirelessly communicates with other wireless enabled computing devices;
enabling a user of the first computing device to interact, through a user interface of the first computing device, with destinations over the IP based network, through the first wireless AP, using a first public IP address associated with the first computing device;
providing a second computing device of the other wireless enabled computing devices with access to the IP based network via the first wireless AP by causing the first computing device to serve the second computing device as a second AP having a second APID, distinct from the first APID, and provide the second computing device access to the IP based network via the first AP; and
tunneling data traffic from the second computing device, through the first computing device, through the first AP, through the IP network, to a proxy server, wherein the proxy server acts as a proxy of the second computing device and the data traffic is secure from the first computing device and the first AP and the second computing device operates on the IP based network using a second public IP address distinct from the first public IP address, with the second public IP address associated with the second computing device.

44. The method of claim 43 further comprising:
allocating, by the proxy server, the second public IP address for the second computing device; and
forwarding data packets destined for the second public IP address to a current IP address associated with the second computing device, wherein the current IP address is distinct from the first public IP address and the second public IP address.

45. The method of claim 44 further comprising:
replacing, by the proxy server, the current IP address with the second public IP address in data packets destined for other servers on the IP based network, wherein the data packets are tunneled from the second computing device, through the first computing device, through the first AP, through the IP network, to the proxy server.

46. The method of claim 44 further comprising updating, by the proxy server, the current IP address associated with the second computing device in response to the second computing device connecting through a different AP.

47. The method of claim 43 wherein the second APID is associated with the proxy server.

48. The method of claim 43 further comprising tunneling data traffic from the second computing device through the first computing device, through the first AP, through the IP network, to a proxy server in response to at least activating data service for the second computing device through a captive portal web interface.

49. The method of claim 43 wherein the first wireless AP is included in a cellular telephone network.

50. The method of claim 49 wherein the first wireless AP is a cellular cell.

51. The method of claim 43 wherein tunneling data traffic is controlled, at least in part, by a network entity in a cellular system.

52. The method of claim 43 wherein the first wireless AP and the second wireless AP use different wireless communication protocols.

53. The method of claim 43 wherein the first wireless AP is included in a terrestrial wireless network.

54. The method of claim 43 further comprising providing, by the second computing device, a third wireless enabled computing device with access to destinations on the IP based network by causing the second computing device to serve the third device as a third AP having a third APID, distinct from the first APID and from the second APID, and provide the third device access to the IP based network via the second AP using the connection between the first computing device and the IP based network through the first AP.

55. The method of claim 54 further comprising restricting destinations on the IP based network accessible by the third device.

56. The method of claim 43 wherein the proxy server acts as a proxy of the second computing device for the second computing device to interact with destinations over the IP based network.

57. The method of claim 43 wherein the second computing device connects to the IP based network through a third AP having a third APID, distinct from the first APID and the second APID, concurrently with connecting to the IP based network through the second AP.

58. The method of claim 43 further comprising preventing data packets destined for the user interface from being accessed by the second computing device.

59. The method of claim 43 further comprising disconnecting the second computing device after a predetermined period.

60. The method of claim 43 wherein the tunneled data traffic includes data packets for use in conducting a IP based phone call.

61. The method of claim 43 wherein the tunneled data traffic includes data packets representing data to be uploaded to a remote server from the second computing device.

62. The method of claim 43 wherein data packets received by the second computing device from a destination through the proxy server, through the IP network, through the first AP, through the first computing device, through the second AP include at least one of a picture, video, or audio.

63. The method of claim 43 wherein the second public IP address is shared by the second computing device with at least one other device of the other wireless enabled computing devices.

64. The method of claim 63 wherein data packets destined for each of the second computing device and the at least one other device are differentiated using different port numbers.

65. The method of claim 43 further comprising preventing the second computing device from accessing internal IP addresses associated with the first computing device.

66. The method of claim 43 further comprising restricting the second computing device from accessing a predetermined set of IP addresses.

67. The method of claim 43 wherein the proxy server provides a dynamic host configuration protocol (DHCP) service that assigns an IP address for the second computing device.

68. The method of claim 43 wherein the proxy server provides a network address translation (NAT) service that translates IP addresses for the second computing device.

\* \* \* \* \*